(12) United States Patent  (10) Patent No.: US 12,068,012 B2
Tachibana et al.  (45) Date of Patent: Aug. 20, 2024

(54) MAGNETIC RECORDING MEDIUM

(71) Applicant: Sony Group Corporation, Tokyo (JP)

(72) Inventors: Junichi Tachibana, Tokyo (JP); Takashi Aizawa, Tokyo (JP); Sogo Oikawa, Tokyo (JP); Shin Saito, Tokyo (JP)

(73) Assignee: Sony Group Corporation, Tokyo (JP)

( * ) Notice: Subject to any disclaimer, the term of this patent is extended or adjusted under 35 U.S.C. 154(b) by 24 days.

(21) Appl. No.: 17/928,063

(22) PCT Filed: May 18, 2021

(86) PCT No.: PCT/JP2021/018750
§ 371 (c)(1),
(2) Date: Nov. 28, 2022

(87) PCT Pub. No.: WO2021/241319
PCT Pub. Date: Dec. 2, 2021

(65) Prior Publication Data
US 2023/0352046 A1  Nov. 2, 2023

(30) Foreign Application Priority Data
May 29, 2020 (JP) .................. 2020-094629

(51) Int. Cl.
*G11B 5/73* (2006.01)
*G11B 33/04* (2006.01)
(52) U.S. Cl.
CPC .......... *G11B 5/7379* (2019.05); *G11B 5/7371* (2019.05); *G11B 33/04* (2013.01)
(58) Field of Classification Search
CPC ....... G11B 5/68; G11B 5/70–718; G11B 5/73; G11B 5/736; G11B 5/7361; G11B 5/7379;
(Continued)

(56) References Cited

U.S. PATENT DOCUMENTS

2019/0198051 A1  6/2019  Kataoka et al.
2019/0325905 A1* 10/2019  Tang ..................... G11B 5/678
(Continued)

FOREIGN PATENT DOCUMENTS

JP  2004206804 A  7/2004
JP  2006012319 A  1/2006
(Continued)

OTHER PUBLICATIONS

English machine translation of WO2019/187731, Tachibana et al. (Oct. 3, 2019) (Year: 2019).*
(Continued)

*Primary Examiner* — Holly Rickman
(74) *Attorney, Agent, or Firm* — K&L Gates LLP

(57) ABSTRACT

An object is to provide a magnetic recording medium having favorable crystal orientation characteristics and exhibiting a high SNR.

The present technology provides a magnetic recording medium having a layer structure including a recording layer, a ground layer, and a base layer in this order, in which the ground layer includes a first ground layer on the recording layer side and a second ground layer on the base layer side, the first ground layer contains a nonmagnetic oxide, the first ground layer has a thickness of 2 nm or more and 10 nm or less, and the second ground layer has a thickness of 40 nm or more. Furthermore, the present technology also provides a magnetic recording cartridge including the magnetic recording medium.

24 Claims, 10 Drawing Sheets

(58) Field of Classification Search
CPC ... G11B 5/7371; G11B 5/7373; G11B 5/7369; G11B 5/7377; G11B 33/04
See application file for complete search history.

(56) References Cited

U.S. PATENT DOCUMENTS

2019/0378540 A1   12/2019   Sekiguchi et al.
2021/0125634 A1   4/2021   Yamaga et al.

FOREIGN PATENT DOCUMENTS

| JP | 2020030880 A | 2/2020 |
| WO | 2010035810 A1 | 4/2010 |
| WO | 2019093447 A1 | 5/2019 |
| WO | 2019159465 A1 | 8/2019 |

OTHER PUBLICATIONS

International Search Report from corresponding PCT application PCT/JP2021/018750, dated Aug. 24, 2021.

\* cited by examiner

MAGNETIC RECORDING MEDIUM

TECHNICAL FIELD

The present technology relates to a magnetic recording medium.

BACKGROUND ART

Typical examples of the magnetic recording medium include a magnetic recording tape and a hard disk medium. In recent years, the former magnetic recording tape has attracted attention anew for data up. This is because spread of the Internet, cloud computing, and accumulation and analysis of big data have progressed, and therefore the amount of information to be recorded over a long period of time has explosively increased, and an increase in recording capacity is required for the magnetic recording medium. Moreover, this magnetic recording tape has advantages in terms of cost, energy saving, long life, reliability, and the like.

Several techniques for increasing a recording capacity of the magnetic recording medium have been proposed so far. For example, Patent Document 1 discloses a technique of forming a ruthenium (Ru) layer under a magnetic layer mainly containing Co—Pt—Cr and also containing a Si oxide. This technique focuses on the fact that Ru has the same hexagonal close-packed structure as cobalt (Co) and this Ru has a lattice constant close to Co, devises crystal orientation of the Ru layer, and enhances crystal orientation characteristics of the magnetic layer to achieve a high coercive force.

CITATION LIST

Patent Document

Patent Document 1: Japanese Patent Application Laid-Open No. 2006-12319

SUMMARY OF THE INVENTION

Problems to be Solved by the Invention

A main object of the present technology is to provide a magnetic recording medium having favorable crystal orientation characteristics and exhibiting a high SNR by devising a configuration of a novel ground layer or the like.

Solutions to Problems

The present technology provides a magnetic recording medium having a layer structure including a recording layer, a ground layer, and a base layer in this order, in which the ground layer includes a first ground layer on the recording layer side and a second ground layer on the base layer side, the first ground layer contains a nonmagnetic oxide, the first ground layer has a thickness of 2 nm or more and 10 nm or less, and the second ground layer has a thickness of 40 nm or more.

The magnetic recording medium according to claim 1, in which the nonmagnetic oxide is $SiO_2$ or $TiO_2$.

The magnetic recording medium according to claim 1, in which the first ground layer containing the nonmagnetic oxide contains a Co-based alloy having an average atomic number ratio represented by the following formula (1):

$$[Co_{(100-y)}Cr_y]_{(100-z)}(MO_2)_z \quad (1)$$

(in which y satisfies $35 \leq y \leq 45$, z satisfies $z \leq 10$, and M is Si or Ti).

The magnetic recording medium according to claim 1, in which the second ground layer contains a Co-based alloy, and the Co-based alloy has an average atomic number ratio represented by the following formula (2):

$$Co_{(100-y)}Cr_y \quad (2)$$

(in which y satisfies $35 \leq y \leq 45$).

The second ground layer may have a thickness of 40 nm or more and 100 nm or less.

The recording layer may contain a nonmagnetic oxide, and the nonmagnetic oxide may be $B_2O_3$.

The recording layer may contain a Co-based alloy particle, and X-ray relative intensity values of in-plane X-ray diffraction on a (11.0) plane and a (10.0) plane of the Co-based alloy particle may satisfy the following relational formula:

$$\Delta I(11.0)/\Delta I(10.0) \geq 0.7$$

(in which $\Delta I(11.0)=|I(11.0)-I_{BG}(11.0)|$ and $\Delta I(10.0)=|I(10.0)-I_{BG}(10.0)|$. Note that I(11.0) represents an X-ray relative intensity value on the (11.0) plane, $I_{BG}(11.0)$ represents a background value of the X-ray relative intensity value on the (11.0) plane, I(10.0) represents an X-ray relative intensity value on the (10.0) plane, and $I_{BG}(10.0)$ represents a background value of the X-ray relative intensity value on the (10.0) plane).

The recording layer may contain a Co-based alloy particle, and the X-ray relative intensity value of in-plane X-ray diffraction on the (10.0) plane of the Co-based alloy particle may satisfy the following relational formula:

$$I(10.0)/I_{BG}(10.0) \geq 1.4$$

(in which I(10.0) represents an X-ray relative intensity value on the (10.0) plane, and $I_{BG}(10.0)$ represents a background value of the X-ray relative intensity value on the (10.0) plane).

An intermediate layer containing ruthenium may be formed between the recording layer and the first ground layer.

The intermediate layer may contain a ruthenium simple substance or a ruthenium alloy.

The ruthenium alloy can have an average atomic number ratio represented by the following formula (3):

$$[Ru_xCo_yCr_{100-x-y}]_{100-z}(MO_2)_z \quad (3)$$

(in the formula (3), x satisfies $10 \leq x \leq 60$, y satisfies $20 \leq y \leq 40$, z satisfies $5 \leq z \leq 20$, and M is Ti or Si).

A seed layer may be formed between the ground layer and the base layer.

The seed layer may include a first seed layer on the ground layer side and a second seed layer on the base layer side.

The first seed layer may contain a nickel-tungsten alloy. The nickel-tungsten alloy can have a composition of an average atomic number ratio represented by the following formula (4):

$$Ni_{(100-x)}W_x \quad (4)$$

(in which x satisfies $1 \leq x \leq 10$). The second seed layer can contain three atoms of Ti, Cr, and O, and can have an average atomic number ratio represented by the following formula (5):

$$(Ti_{(100-x)}Cr_x)_{(100-y)}O_y \quad (5)$$

(in which x satisfies $30 \leq x \leq 70$, and y satisfies $y \leq 10$).

A thickness $t_T$ of the magnetic recording medium can satisfy $t_T \leq 5.6$ μm.

A thickness $t_n$ of the recording layer can satisfy $nm \leq t_n \leq 20$ nm.

The base layer can have a thickness of 5.0 μm or less.

The magnetic recording medium can include a back layer having a thickness $t_b$ satisfying $t_b \leq 0.6$ μm.

The magnetic recording medium can have a squareness ratio of 93% or more in a perpendicular direction.

Furthermore, the present technology also provides a magnetic recording cartridge including a magnetic recording medium having a layer structure including a recording layer, a ground layer, and a base layer in this order, the ground layer including a first ground layer on the recording layer side and a second ground layer on the base layer side, the first ground layer containing a nonmagnetic oxide, the first ground layer having a thickness of 2 nm or more and 10 nm or less, and the second ground layer having a thickness of 40 nm or more, in which the magnetic recording medium is housed in a state of being wounded around a reel.

MODE FOR CARRYING OUT THE INVENTION

Figure 1:
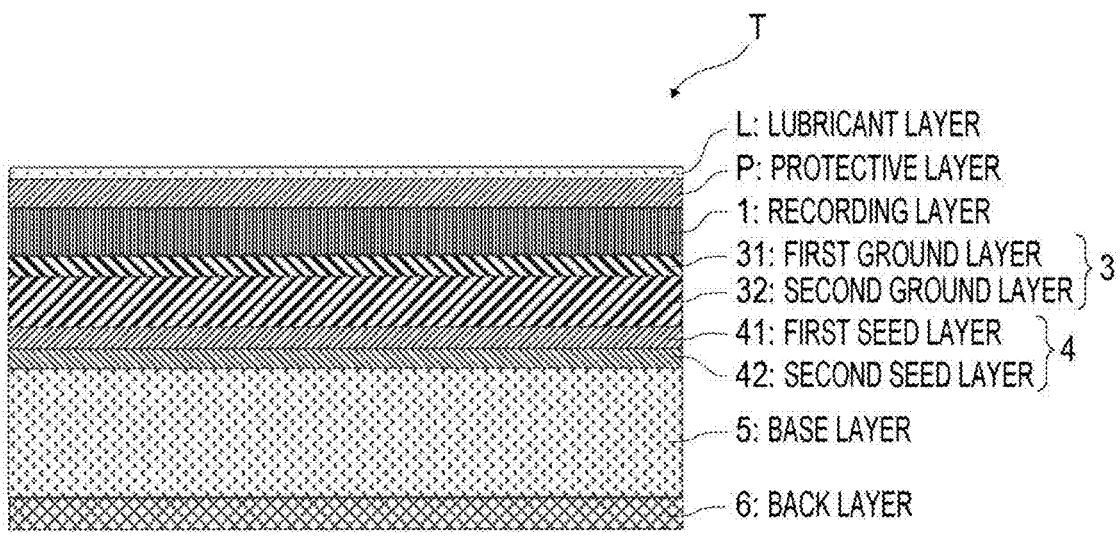
FIG. 1 is a diagram illustrating an example of a basic layer structure of a first embodiment.

Hereinafter, embodiment examples suitable for carrying out the present technology will be described with reference to the attached drawings. Note that the embodiment examples described below illustrate embodiments and modifications suitable for the present technology, and therefore the present technology is not limited thereto narrowly, and various modifications based on the technical idea of the present technology can be made. For example, the configurations, the methods, the steps, the shapes, the materials, the numerical values, and the like exemplified in the embodiment examples described below and modifications thereof are only examples, and a configuration, a method, a step, a shape, a material, a numerical value, and the like different therefrom may be used as necessary. Furthermore, in a case where chemical formulas of compounds and the like are described, these chemical formulas are representative and are not limited to the described valences and the like as long as the compounds have common names of the same compound. Furthermore, the configurations, the methods, the steps, the shapes, the materials, the numerical values, and the like in the embodiment examples described below and modifications thereof can be combined with each other as long as not departing from the gist of the present technology. Description will be made in the following order.

1. Description of present technology
2. First Embodiment
   (1) Configuration of magnetic recording medium
   (2) Description of each layer
   (3) Dimensions of magnetic recording medium
   (4) Configuration of sputtering device
   (5) Method for manufacturing magnetic recording medium
3. Second Embodiment
   (1) Configuration of magnetic recording medium
   (2) Description of each layer
4. Third Embodiment
   (1) Configuration of magnetic recording medium
   (2) Description of each layer
5. Fourth Embodiment
   (1) Configuration of magnetic recording medium
6. Fifth Embodiment
   (1) Configuration of magnetic recording medium
   (2) Description of each layer
7. Sixth Embodiment
   (1) Configuration of magnetic recording medium
8. Example of method for manufacturing magnetic recording medium according to present technology
9. Embodiment of recording/reproducing device according to present technology
10. Embodiment of magnetic recording cartridge according to present technology
11. Modification of magnetic recording cartridge according to present technology
12. Examples

1. DESCRIPTION OF PRESENT TECHNOLOGY

There is a demand for an increase in recording capacity of a magnetic recording medium (for example, a magnetic recording tape). In order to increase the recording capacity, for example, it is conceivable to further improve crystal orientation characteristics of a magnetic layer which is a recording layer formed on a surface layer of a magnetic recording tape.

However, the crystal orientation characteristics of the magnetic layer are affected not only by the composition of a magnetic particle material of the magnetic layer but also by a ground layer or the like interposed between the magnetic layer and a base layer, and furthermore, also affect a signal-noise ratio (hereinafter, referred to as SNR) of the magnetic recording tape.

The present inventors have studied a magnetic recording medium capable of obtaining high crystal orientation characteristics by adjusting the thickness and composition of each layer regarding a multilayer structure constituting the magnetic recording medium.

The present inventors have found that an effect of enhancing crystal orientation of a recording layer which is a magnetic layer is high by forming a ground layer so as to have a two-layer structure including a first ground layer on the recording layer side and a second ground layer on a base layer side, causing the first ground layer to contain a nonmagnetic oxide of $CoCr(SiO_2)$ or $CoCr(TiO_2)$, and forming the first ground layer so as to have a thin thickness of 2 nm or more and 10 nm or less, and have further found a decrease in magnetic isolation can be suppressed by forming the second ground layer so as to have a thick thickness of 40 nm or more. That is, the present technology provides a magnetic recording medium having a layer structure including a recording layer, a ground layer, and a base layer in this order, in which the ground layer includes a first ground layer on the recording layer side and a second ground layer on the base layer side, the first ground layer contains a nonmagnetic oxide, the first ground layer has a thickness of 2 nm or more and 10 nm or less, and the second ground layer has a thickness of 40 nm or more.

For example, in a case where the ground layer located immediately below the recording layer contains a nonmagnetic oxide such as $CoCr(SiO_2)$, when the thickness of the ground layer is less than 20 nm, the magnetic isolation of the recording layer may decrease. However, as described above, the fact that the thickness of the ground layer is less than 20 nm contributes to enhancement of the crystal orientation of the recording layer, and moreover, a decrease in magnetic isolation can be compensated for by forming the second ground layer so as to have a thick thickness.

Figure 7:
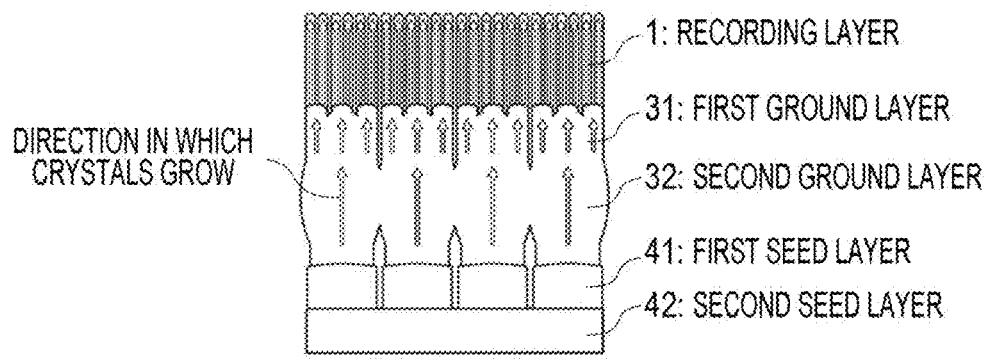
FIG. 7 is an enlarged diagram schematically illustrating a layer structure of a recording medium according to the present technology.

The magnetic recording medium according to the present technology has a layer structure including a recording layer, a ground layer, and a base layer in this order. FIG. 7 is an enlarged diagram schematically illustrating an example of a layer structure formed on the base layer in the layer structure. The layer structure of the magnetic recording medium includes a recording layer 1 functioning as a magnetic recording layer, a first ground layer 31 formed immediately below the recording layer 1, a second ground layer 32 adjacent to the first ground layer 31, a first seed layer 41 formed immediately below the second ground layer 32, and a second seed layer 42 adjacent to the first seed layer 41. In FIG. 7, arrows indicate directions in which crystals grow. In the magnetic recording medium according to the present technology, for example, the first ground layer 31 illustrated in FIG. 7 has a thickness of 2 nm or more and 10 nm or less. Furthermore, the second ground layer 32 may have a thickness of 40 nm or more.

Note that other layers may be included in addition to the layers illustrated in FIG. 7. The other layers may be appropriately selected according to the type of magnetic recording medium. The magnetic recording medium according to the present technology may be, for example, a vacuum thin film type magnetic recording medium.

The thickness of the first ground layer of the magnetic recording medium according to the present technology is 2 nm or more, preferably 5 nm or more, more preferably 5.2 nm or more, and still more preferably 5.5 nm or more. Furthermore, the thickness of the first ground layer is 10 nm or less, preferably 9 nm or less, more preferably 8 nm or less, and still more preferably 7 nm or less. In the magnetic recording medium according to the present technology, crystal orientation of a magnetic layer which is the recording layer can be improved by reducing the thickness of the first ground layer in this manner.

The thickness of the second ground layer of the magnetic recording medium according to the present technology is 40 nm or more, preferably 45 nm or more, more preferably 46 nm or more, still more preferably 47 nm or more, and further still more preferably 48 nm or more. Furthermore, the thickness of the second ground layer is preferably 100 nm or less, more preferably 80 nm or less, still more preferably 70 nm or less, and further still more preferably 60 nm or less. The magnetic recording medium according to the present technology can suppress a decrease in magnetic isolation of a magnetic layer which is the recording layer by increasing the thickness of the second ground layer in this manner.

2. FIRST EMBODIMENT (1) Configuration of Magnetic Recording Medium

First, a configuration of a magnetic recording medium T according to a first embodiment will be described with reference to FIG. 1. In the magnetic recording medium T, a seed layer 42 and a seed layer 41 having a two-layer structure are sequentially laminated on one main surface of a long base layer 5, ground layers 31 and 32 having a two-layer structure are sequentially laminated immediately above the seed layer 41, a recording layer 1 functioning as a magnetic recording layer is formed on the ground layer 31, and a protective layer P and a lubricant layer L are formed on the recording layer 1. Then, a back layer 6 is formed on the other main surface of the base layer 5. The seed layer 42, the seed layer 41, the ground layers 31 and 32, and the recording layer 1 can be each, for example, a vacuum thin film such as a layer formed by sputtering (hereinafter also referred to as a "sputtering layer"). The magnetic recording medium T is long and travels in a longitudinal direction thereof during recording/reproduction.

The magnetic recording medium T according to the first embodiment is suitable for use as a storage medium for data archive, a demand of which is expected to increase in the future. The magnetic recording medium T can achieve, for example, a surface recording density of times or more a current coating type magnetic recording medium for storage, that is, a surface recording density of 100 Gb/in$^2$ or more. In a case where a general linear recording type data cartridge is formed using the magnetic recording medium T having such a surface recording density, it is possible to perform large-capacity recording of 200 TB or more per data cartridge.

The magnetic recording medium T according to the first embodiment is suitable for use in a recording/reproducing device (recording/reproducing device for recording and reproducing data) including a ring type recording head and a giant magnetoresistive (GMR) type or tunneling magnetoresistive (TMR) type reproducing head. Furthermore, the magnetic recording medium T according to the first embodiment preferably uses a ring type recording head as a servo signal writing head. A data signal is perpendicularly recorded on the recording layer 1 by, for example, a ring type recording head. Furthermore, a servo signal is perpendicularly recorded on the recording layer 1 by, for example, a ring type recording head.

(2) Description of Each Layer

Note that the layer configuration of the first embodiment corresponds to layer configurations of Examples 1 to 8 described later. Hereinafter, the configuration of each layer will be described from the recording layer 1 to the base layer 5, and finally, the back layer 6 as the lowermost layer will be described. Furthermore, in the description of the present technology, the recording layer 1 side of the base layer is defined as an upper side, and the back layer 6 side of the base layer 5 is defined as a lower side. Layers common to all the embodiments according to the present technology are denoted by the same reference numerals in all the attached drawings, and redundant description of configurations, materials, and the like of the common layers is omitted.

(Recording Layer)

The recording layer 1 is a layer containing magnetic crystal particles, and can function as a layer that records or reproduces a signal using magnetism. The recording layer 1 can be a perpendicular magnetic recording layer in which magnetic crystal particles are perpendicularly oriented. Moreover, the recording layer 1 is preferably a granular magnetic layer having a granular structure containing a Co-based alloy from a viewpoint of improving a recording density.

The recording layer 1 having a granular structure contains ferromagnetic crystal particles containing a Co-based alloy and nonmagnetic grain boundaries (nonmagnetic material) existing so as to surround the ferromagnetic crystal particles. More specifically, the recording layer 1 having a granular structure contains columns (columnar crystals) containing a Co-based alloy and nonmagnetic grain boundaries that surround the columns and physically and magnetically separate the columns from each other. Due to such a granular structure, the recording layer 1 exhibits a structure in which columnar magnetic crystal particles are magnetically separated from each other.

The Co-based alloy has a hexagonal close-packed (hcp) structure, and its c-axis is oriented in a direction perpendicular to a film surface (magnetic recording medium thickness direction). As described above, since the recording layer 1 has the hexagonal close-packed structure, the orientation characteristics of the recording layer 1 are further enhanced. As the Co-based alloy, a CoCrPt-based alloy containing at least Co, Cr, and Pt is preferably adopted. The CoCrPt-based alloy is not particularly narrowly limited and may further contain an additive element. Examples of the additive element include one or more elements selected from Ni, Ta, and the like. Preferably, the recording layer 1 can have a granular structure in which particles containing Co, Pt, and Cr are separated from each other by an oxide.

The nonmagnetic grain boundaries surrounding the ferromagnetic crystal particles contain a nonmagnetic metal material. Here, the metal includes a semimetal. The nonmagnetic metal material may be, for example, a nonmagnetic oxide. As the nonmagnetic oxide, at least one selected from a metal oxide and a metal nitride can be adopted, and a metal oxide is preferably used from a viewpoint of maintaining the above granular structure more stably.

For example, the recording layer 1 preferably has an average atomic number ratio (also referred to as average composition) represented by the following formula (6).

$(Co_xPt_yCr_{100-x-y})_{100-z}\text{-}(MO_X)_z$ \hfill (6)

(in the formula (6), x, y, and z satisfy $65 \leq x \leq 80$, $10 \leq y \leq 20$, and $9 \leq z \leq 12$, respectively, and $MO_X$ represents a metal oxide. The metal oxide is as described below).

Examples of the metal oxide suitable for the nonmagnetic grain boundaries (for example, MOx in the above formula (6)) include a metal oxide containing at least one element selected from Si, Cr, Cr, Al, Ti, Ta, Zr, Ce, Y, B, and Hf. Specific examples thereof include $SiO_2$, $Cr_2O_3$, $CuO$, $Al_2O_3$, $TiO_2$, $Ta_2O_5$, $ZrO_2$, $B_2O_3$, and $HfO_2$. The metal oxide preferably contains one, two, or three selected from $SiO_2$, $B_2O_3$, and $TiO_2$, and more preferably the metal oxide is $B_2O_3$.

Examples of the above metal nitride suitable for the nonmagnetic grain boundaries include a metal nitride containing at least one element selected from Si, Cr, Co, Al, Ti, Ta, Zr, Ce, Y, and Hf. Specific examples thereof include SiN, TiN, and AlN. These metal nitrides may be contained, for example, instead of Ox in the above formula (4).

A reason why the metal oxide is preferably $B_2O_3$ will be described below.

A role of the nonmagnetic grain boundaries in the granular structure is to reduce an effect of exchange interaction acting between the ferromagnetic crystal particles by separating the Co-based alloy columns from each other as described above, that is, by spatially separating the ferromagnetic crystal particles from each other. It has been clarified that a process in which sputtered particles reach a base film and are precipitated largely affects a state of this granular structure, and a fact that the melting point of a material constituting the nonmagnetic grain boundaries is lower than the melting point of a material constituting the ferromagnetic crystal particles leads to a favorable granular structure. For example, in a case where $Co_{80}Pt_{20}$ is considered as a material of the ferromagnetic crystal particles, $Co_{80}Pt_{20}$ has a melting point of 1450° C. In a case where the nonmagnetic grain boundaries contain $SiO_2$ and $TiO_2$, the melting points thereof are 1600° C. and 1843° C., respectively, which are higher than that of $Co_{80}Pt_{20}$, but $B_2O_3$ has a melting point of 470° C., which is extremely lower than that of $Co_{80}Pt_{20}$. In a case where the melting point of the material of the nonmagnetic grain boundaries is lower than that of the ferromagnetic crystal particles, the ferromagnetic crystal particle are precipitated first at a distal end portion of a ground layer column, and the material of the nonmagnetic grain boundaries is precipitated between the ferromagnetic particles after cooling proceeds and the temperature decreases, thereby achieving a favorable granular structure. Therefore, it is considered that $B_2O_3$ is suitable as the oxide in the recording layer (Reference Document: K. K. Tham, R. Kushibiki, S. Hinata, and S. Saito, "B2O3: Grain boundary material for high-Ku CoPt-oxide granular media with low degree of intergranular exchange coupling," Jpn. J. Appl. Phys., vol. 55, p. 07MC06, June 2016).

For the reasons described above, in the present technology, the recording layer 1 can preferably have a granular structure including magnetic crystal particles (particularly columnar magnetic crystal particles) and nonmagnetic grain boundaries surrounding the magnetic crystal particles. The melting point of the material forming the nonmagnetic grain boundaries may be preferably lower than that of the material forming the magnetic crystal particles, and may be lower, for example, by 100° C. or more, more preferably by 300° C. or more, still more preferably by 500° C. or more, by 600° C. or more, or by 700° C. or more. A difference between the melting point of the former and the melting point of the latter may be, for example, 1200° C. or less, 1100° C. or less, or 1000° C. or less. That is, the melting point of the material forming the nonmagnetic grain boundaries may be lower than that of the material forming the magnetic crystal particles, for example, by 100° C. to 1200° C., more preferably by 300° C. to 1100° C., still more preferably by 500° C. to 1000° C.

The Co-based alloy has a hexagonal close-packed (hcp) structure, and its c-axis is oriented in a direction perpendicular to a film surface (magnetic recording medium thickness direction). Such a degree of orientation of the c-axis can be estimated by in-plane X-ray diffraction (In-Plane XRD).

In the in-plane X-ray diffractometry, by causing an X-ray to be incident on a sample surface to be measured at an angle (0.2 to 0.5°) near a critical angle of total reflection and performing scanning in an in-plane direction of the sample, a state of an area away from the sample surface by about several tens of nm can be analyzed.

For example, in a case where a CoPt-based alloy thin film having a hexagonal close-packed structure (hcp) has a c-axis oriented in a direction perpendicular to a film surface, in a case where a Cu—$K_\alpha$ radiation source is used as an X-ray source, a peak of a (10.0) plane (hcp (10.0)) of hcp appears in the vicinity of 40°, a peak of a (11.0) plane (hcp (11.0)) of hcp appears in the vicinity of 74°, and the degree of orientation of the c-axis can be estimated from each peak height (X-ray relative intensity).

In the present technology, the X-ray relative intensities of in-plane X-ray diffractometry on the (11.0) plane and the (10.0) plane of the Co-based alloy particle contained in the recording layer 1 may preferably satisfy the following relational formula.

$$\Delta I(11.0)/\Delta I(10.0) \geq 0.7$$

$\Delta I(11.0)$ means a difference between an X-ray relative intensity value on the (11.0) plane of the CoPtCr alloy particle that is a Co-based alloy particle and a background value of the X-ray relative intensity value of the alloy particle on the (11.0) plane, that is, $\Delta I(11.0)=|I(11.0)-I_{BG}(11.0)|$. Furthermore, $\Delta I(10.0)$ means a difference between an X-ray relative intensity value on the (10.0) plane of the CoPtCr alloy particle that is a Co-based alloy particle and a background value of the X-ray relative intensity value of the alloy particle on the (10.0) plane, that is, $\Delta I(10.0)$.

Figure 13:
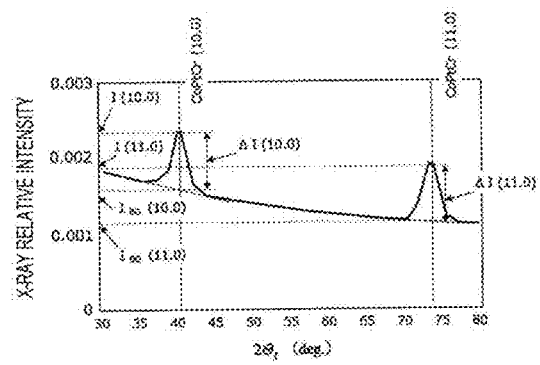
FIG. 13 is an X-ray relative intensity value curve (XRD profile) measured by in-plane X-ray diffractometry (In-Plane XRD).
Figure 14:
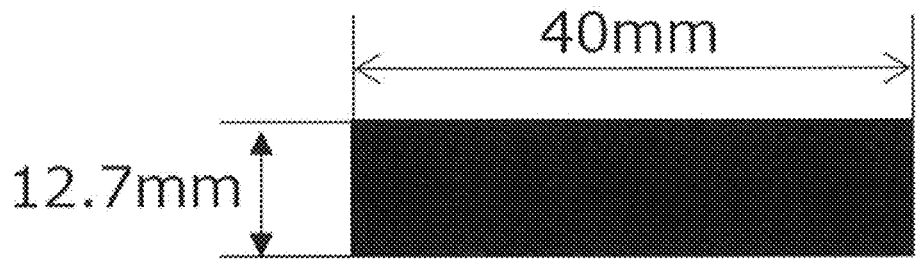
FIG. 14 is a schematic diagram schematically illustrating a cut-out measurement sample in in-plane X-ray diffractometry (In-Plane XRD).

As illustrated in FIG. 13, in the X-ray relative intensity value curve (XRD profile), on a straight line connecting the vicinity of $2\theta_\chi 35°$) to the vicinity of 45°, an X-ray relative intensity value at a $2\theta_\chi$ angle at which the X-ray relative intensity value on the (10.0) plane of the CoPtCr alloy particle is a peak (maximum value) is defined as a background value ($I_{BG}(10.0)$). Furthermore, as illustrated in FIG. 14, in the X-ray relative intensity value curve (XRD profile), on a straight line connecting the vicinity of $2\theta_\chi 65°$) to the vicinity of 80°, an X-ray relative intensity value at a $2\theta_\chi$ angle at which the X-ray relative intensity value on the (11.0) plane of the CoPtCr alloy particle is a peak (maximum value) is defined as a background value ($I_{BG}(11.0)$).

This means that the degree of c-axis orientation increases as $\Delta I(11.0)/\Delta I(10.0)$ increases, and the degree of c-axis orientation decreases as $\Delta I(11.0)/\Delta I(10.0)$ decreases. In the present technology, $\Delta I(11.0)/\Delta I(10.0)$ is preferably 0.7 or more, more preferably 0.8 or more, and still more preferably 0.9 or more. $\Delta I(11.0)/\Delta I(10.0)$ can be estimated to reflect an occurrence ratio of a laminating fault. Note that $\Delta I(11.0)/\Delta I(10.0)$ may be, for example, 2.0 or less.

In the present technology, the X-ray relative intensity of in-plane X-ray diffraction on the (10.0) plane of the Co-based alloy particle contained in the recording layer 1 may satisfy the following relational formula.

$$I(10.0)/I_{BG}(10.0) \geq 1.4$$

$I(10.0)$ represents an X-ray relative intensity on the (10.0) plane of the CoPtCr alloy particle that is a Co-based alloy particle, and $I_{BG}(10.0)$ represents a background value of the X-ray relative intensity of the alloy particle on the (10.0) plane.

This means that the degree of c-axis orientation increases as $I(10.0)/I_{BG}(10.0)$ increases, and the degree of c-axis orientation decreases as $I(10.0)/I_{BG}(10.0)$ decreases. In the present technology, $I(10.0)/I_{BG}(\mathbf{10.0})$ is preferably 1.4 or more, more preferably 1.45 or more, and still more preferably 1.5 or more. Note that $I(10.0)/I_{BG}(10.0)$ can be estimated to have a lower sensitivity to reflect the occurrence ratio of the laminating fault than the above $\Delta I(11.0)/\Delta I(10.0)$. Note that $I(10.0)/I_{BG}(10.0)$ may be, for example, 3.0 or less or 2.0 or less.

The thickness $t_n$ of the recording layer 1 is preferably 10 nm or more and 20 nm or less, more preferably 11 nm or more and 19 nm or less, and still more preferably 12 nm or more and 18 nm or less.

(Protective Layer)

Note that in FIG. 1 and the like, a reference sign P represents a protective layer. The protective layer P is a layer that plays a role of protecting the recording layer 1. The protective layer P contains, for example, a carbon material or silicon dioxide ($SiO_2$). The protective layer P preferably contains a carbon material from a viewpoint of film strength of the protective layer P. Examples of the carbon material include graphite, diamond-like carbon (abbreviated as DLC), and diamond. Note that the protective layer P is common to all the following embodiment examples.

(Lubricant Layer)

A lubricant layer L may be formed on the protective layer P (see FIG. 1). The lubricant layer L is a layer containing a lubricant, and mainly plays a role of reducing friction of the magnetic recording medium T during traveling.

The lubricant layer L contains at least one lubricant. The lubricant layer L may further contain various additives such as a rust preventive as necessary. The lubricant contains at least one carboxylic acid-based compound having at least two carboxyl groups and one ester bond and represented by the following general chemical formula (1). The lubricant may further contain a lubricant other than the carboxylic acid-based compound represented by the following general chemical formula

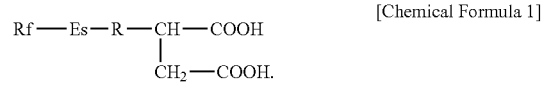

[Chemical Formula 1]

(In the formula, Rf represents an unsubstituted or substituted and saturated or unsaturated fluorine-containing hydrocarbon group or hydrocarbon group, Es represents an ester bond, and R represents an unsubstituted or substituted and saturated or unsaturated hydrocarbon group, in which R may be absent.)

The above carboxylic acid-based compound is preferably represented by the following general chemical formula (2) or (3).

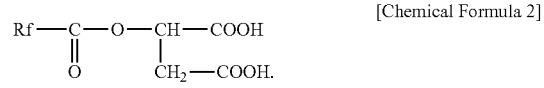

[Chemical Formula 2]

(In the formula, Rf represents an unsubstituted or substituted and saturated or unsaturated fluorine-containing hydrocarbon group or hydrocarbon group.)

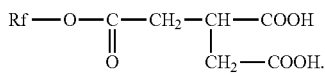
[Chemical Formula 3]

(In the formula, Rf represents an unsubstituted or substituted and saturated or unsaturated fluorine-containing hydrocarbon group or hydrocarbon group.)

The lubricant preferably contains one or both of the carboxylic acid-based compounds represented by the above general chemical formulas (2) and (3).

When a lubricant containing the carboxylic acid-based compound represented by general chemical formula (1) is applied to the magnetic layer 1, the protective layer P, or the like, a lubricating action is exhibited by a cohesive force between the fluorine-containing hydrocarbon groups or hydrocarbon groups Rfs, which are hydrophobic groups. In a case where the Rf group is a fluorine-containing hydrocarbon group, the total carbon number of the compound is preferably 6 to 50, and the total carbon number of the fluorinated hydrocarbon group is preferably 4 to 20. The Rf group may be saturated or unsaturated, and linear, branched, or cyclic, but is particularly preferably saturated and linear.

For example, in a case where the Rf group is a hydrocarbon group, the hydrocarbon group is desirably a group represented by the following general chemical formula (4).

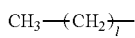
[Chemical Formula 4]

(in general chemical formula (4), l is an integer selected from a range of 8 to 30, more desirably from a range of 12 to 20.)

Furthermore, in a case where the Rf group is a fluorine-containing hydrocarbon group, the fluorine-containing hydrocarbon group is desirably a group represented by the following general chemical formula (5).

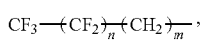
[Chemical Formula 5]

(in general chemical formula (5), m is an integer selected from a range of 2 to 20, more desirably from a range of 4 to 13, and n is an integer selected from a range of 3 to 18, more desirably from a range of 3 to 10.

The fluorinated hydrocarbon groups may be concentrated in one place as described above, or may be dispersed as illustrated in the following general chemical formula (6), and may be not only —$CF_3$ and —$CF_2$— but also —$CHF_2$, —CHF—, and the like.

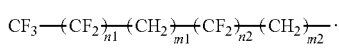
[Chemical Formula 6]

(in general chemical formula (6), n1+n2=n and m1+m2=m.)

A reason why the number of carbon atoms is limited as described above in general chemical formulas (4), (5), and (6) is as follows. That is, when the number of carbon atoms (l or the sum of m and n) constituting the alkyl group or the fluorine-containing alkyl group is the above lower limit or more, the length of the alkyl group or the fluorine-containing alkyl group is an appropriate length, a cohesive force between the hydrophobic groups is effectively exhibited, a favorable lubricating action is exhibited, and friction/wear durability is improved. Furthermore, when the number of carbon atoms is the above upper limit or less, solubility of the lubricant containing the above carboxylic acid-based compound in a solvent is kept favorable.

In particular, when the Rf group contains a fluorine atom, the Rf group has an effect of reducing a coefficient of friction and moreover, improving traveling performance and the like. Provided that preferably, a hydrocarbon group is disposed between a fluorine-containing hydrocarbon group and an ester bond to separate the fluorine-containing hydrocarbon group and the ester bond from each other, thus ensuring stability of the ester bond to prevent hydrolysis. Furthermore, the Rf group may have a fluoroalkyl ether group or a perfluoropolyether group. The R group may be absent. However, in a case where the R group is present, the R group is preferably a hydrocarbon chain having a relatively small number of carbon atoms. Furthermore, the Rf group or the R group may contain an element such as nitrogen, oxygen, sulfur, phosphorus, or halogen as a constituent element, and may further have a hydroxyl group, a carboxyl group, a carbonyl group, an amino group, an ester bond, and the like in addition to the functional groups described above.

Specifically, the carboxylic acid-based compound represented by the above general chemical formula (1) is preferably at least one selected from the compounds illustrated below. That is, the lubricant preferably contains at least one selected from the following compounds.

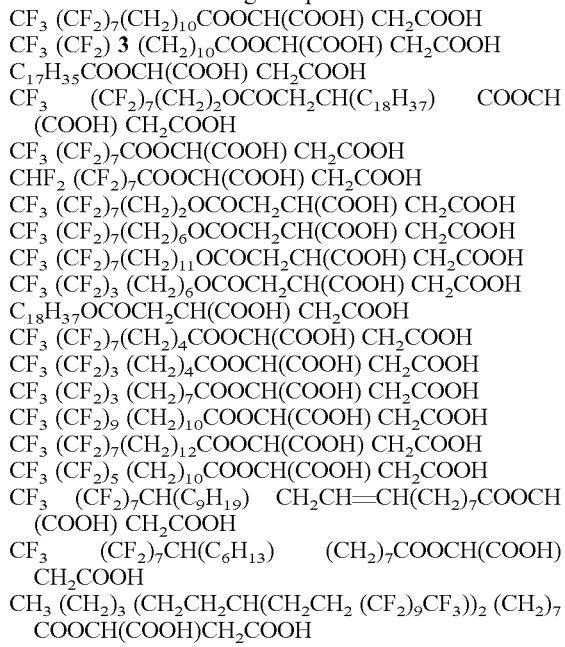

The carboxylic acid-based compound represented by the above general chemical formula (1) is soluble in a non-fluorine-based solvent having a small load on environment, and is advantageous because an operation such as application, dipping, or spraying can be performed using a general-purpose solvent such as a hydrocarbon-based solvent, a ketone-based solvent, an alcohol-based solvent, or an ester-based solvent. Specific examples thereof include solvents such as hexane, heptane, octane, decane, dodecane, benzene, toluene, xylene, cyclohexane, methyl ethyl ketone, methyl isobutyl ketone, methanol, ethanol, isopropanol, diethyl ether, tetrahydrofuran, dioxane, and cyclohexanone.

In a case where the protective layer P contains a carbon material, when the above carboxylic acid-based compound is applied onto the protective layer P as a lubricant, two carboxyl groups which are polar group portions of a lubricant molecule and at least one ester bond group are adsorbed on the protective layer P, and a lubricant layer L having particularly favorable durability can be formed due to a cohesive force between hydrophobic groups.

Note that the lubricant may be not only held as the lubricant layer L on a surface of the magnetic recording tape T as described above, but also contained and held in a layer such as the recording layer 1 or the protective layer P constituting the magnetic recording medium T.

(Ground Layer)

In the first embodiment example illustrated in FIG. 1, a ground layer 3 is formed immediately below the above recording layer 1. The ground layer 3 has a two-layer structure including the first ground layer 31 on the above recording layer 1 side and the second ground layer 32 on the base layer 5 side.

The first ground layer 31 contains a nonmagnetic oxide. According to a preferred embodiment of the present technology, the nonmagnetic oxide contained in the first ground layer 31 can contain at least Co and Cr and can further contain a metal oxide.

The first ground layer 31 preferably contains a Co-based alloy similar to the recording layer 1 (described above) containing a Co-based alloy. A reason for this is that, when a Co-based alloy is used for the first ground layer 31, the first ground layer 31 has a crystal structure having the same hexagonal close-packed (hcp) structure as the recording layer 1 described above, and its c-axis is oriented in a direction perpendicular to a film surface (a thickness direction of a magnetic recording tape). As described above, since the first ground layer 31 has the same hexagonal close-packed structure as the recording layer 1, orientation characteristics of the recording layer 1 can be further enhanced.

The nonmagnetic oxide contained in the first ground layer 31 may contain silicon dioxide ($SiO_2$) or titanium dioxide ($TiO_2$) within a range indicated by an average atomic number ratio represented by the following formula (1):

$$[Co_{(100-y)}Cr_y]_{(100-z)}(MO_2)_z \quad (1)$$

(in which y satisfies 35≤y≤45, z satisfies z≤10, and M is Si or Ti.)

In the above formula (1) related to the first ground layer 31, an hcp phase is obtained when y satisfies 0≤y≤34, and a σ phase is obtained when z satisfies 54≤y≤66. In a case where the CoCr film is in a coexistence state of the hcp phase and the σ phase, a metal film having a hexagonal close-packed structure that grows on the CoCr film has favorable c-axis orientation to the perpendicular direction and an isolated column shape. A case where y is less than 35 is unsuitable because the CoCr film is only in the hcp phase, and therefore isolation of a column of the metal film growing on the CoCr film decreases. Meanwhile, a case where y exceeds 45 is unsuitable because the c-axis orientation of the metal film growing on the CoCr film decreases by an increase in the ratio of the σ phase in the CoCr film.

In the above formula (1) related to the first ground layer 31, a case where z exceeds 10 is not preferable because the amount of the magnetic columnar crystals (columns) of the Co-based alloy and the nonmagnetic grain boundaries that surround the columns and physically and magnetically separate the columns from each other is excessive, and a structure in which the columnar magnetic crystal particles are magnetically excessively separated from each other is exhibited.

The first ground layer 31 can further contain a metal oxide. The metal oxide can constitute nonmagnetic grain boundaries. Examples of the metal oxide include a metal oxide containing at least one element selected from Cr, Cr, Al, Ti, Ta, Zr, Ce, Y, B, and Hf in addition to $SiO_2$. Specific examples thereof include $Cr_2O_3$, CuO, $Al_2O_3$, $TiO_2$, $Ta_2O_5$, $ZrO_2$, $B_2O_3$, and $HfO_2$, and a metal oxide containing $SiO_2$, $B_2O_3$, or $TiO_2$ is particularly preferable.

The thickness of the first ground layer 31 is 2 nm or more and 10 nm or less, preferably 5 nm or more and 10 nm or less, and more preferably 5.2 nm or more and 8 nm or less. In a case where the thickness of the first ground layer 31 is less than 2 nm, it is difficult to form a mountain shape at a top of a column, which is a key to the granular shape, and sufficient granularity of an intermediate layer growing on the first ground layer 31 cannot be ensured. Furthermore, in a case where the thickness of the first ground layer 31 exceeds 10 nm, the column size of the intermediate layer increases due to coarsening of the column. Therefore, the column size of the magnetic layer finally increases, and noise of the recording/reproducing characteristics increases.

Next, the description of the first ground layer 31 described above also applies to the second ground layer 32 formed immediately below the first ground layer 31. For example, the second ground layer 32 preferably contains a nonmagnetic oxide. The nonmagnetic oxide contained in the second ground layer preferably has an average atomic number ratio represented by the following formula (2):

$$Co_{(100-y)}Cr_y \quad (2)$$

(in which y satisfies 35≤y≤45).

Furthermore, the thickness of the second ground layer 32 is preferably thicker than the above thickness of the first ground layer 31 from a viewpoint of improving crystal orientation of the recording layer 1.

The thickness of the second ground layer 32 is 40 nm or more, preferably 45 nm or more, more preferably 46 nm or more, still more preferably 47 nm or more, and further still more preferably 48 nm or more from a viewpoint of improving granularity. Furthermore, the thickness of the second ground layer 32 is preferably 100 nm or less, more preferably 80 nm or less, still more preferably 70 nm or less, and further still more preferably 60 nm or less.

(Seed Layer)

The seed layer represented by a reference sign 4 in FIG. 1 and the like is a layer located below the ground layer 3 and formed immediately above one main surface of the base layer 5 (described later). According to one embodiment of the present technology, the first seed layer 41 may be formed immediately below the ground layer 3, and the second seed layer 42 may be further formed immediately below the first seed layer 41. That is, the seed layer 4 of the present embodiment example may have a two-layer structure including the first seed layer 41 and the second seed layer 42.

The seed layer 4 is preferably formed from a viewpoint of ensuring a favorable signal-to-noise ratio (SNR) even in a case where an intermediate layer 2 described later is formed thinly or even in a layer configuration not including the intermediate layer 2. Furthermore, the seed layer 4 also plays a role of bringing the base layer 5 into close contact with upper layers equal to or higher than the ground layer 3, that is, the ground layer 3 (31 and 32) and the recording layer 1.

The first seed layer 41 may contain a nickel-tungsten alloy. The nickel-tungsten alloy can have, for example, an average atomic number ratio represented by the following formula (4):

$$Ni_{(100-x)}W_x \qquad (4)$$

(in which x may satisfy 1≤x≤10, preferably 2≤x≤10, more preferably 4≤x≤8, and particularly x=6.)

The nickel-tungsten alloy may particularly contain ($Ni_{94}W_6$).

Alternatively, the second seed layer 42 may contain three atoms of Ti, Cr, and O, and may have a composition of an average atomic number ratio represented by the following formula (5). When the first seed layer 41 contains nickel tungsten ($Ni_{94}W_6$) and the second seed layer 42 contains three atoms of Ti, Cr, and O, matching with the ground layer 3 (31, 32) and the recording layer 1 similarly containing Cr is improved, which is preferable.

$$(Ti_{(100-x)}Cr_x)_{(100-y)}O_y \qquad (5)$$

(in which x satisfies 30≤x≤70, preferably 35≤x≤65, more preferably 40≤x≤60, still more preferably 45≤x≤65, and y satisfies y≤10, preferably y≤8, more preferably y≤5. y satisfies 0<y, for example, 0.5≤y, particularly 1≤y.)

With regard to the above formula (5), in a case where y is too large, for example, in a case where y exceeds 10, $TiO_2$ crystals are generated in the seed layer, and a function as an amorphous film is significantly deteriorated, which is not preferable.

Since Ti contained in the seed layer 4 has a hexagonal close-packed structure like the Co-based alloy, matching with the crystal structure in the recording layer 1 and the ground layer 3 is favorable.

The seed layer 4 contains oxygen. This is because oxygen derived from or caused by a film constituting the base layer 5 described later enters the seed layer 4. In this regard, the seed layer 4 has a different atomic configuration from a seed layer of a hard disk (HDD) that does not use the base layer 5 constituted by a film. Note that the total thickness of the seed layer 4 is preferably 5 nm or more and 30 nm or less, more preferably 6 nm or more and 20 nm or less, and still more preferably 7 nm or more and 15 nm or less.

The thickness of the first seed layer 41 is preferably 5 nm or more and 30 nm or less, more preferably 6 nm or more and 20 nm or less, and still more preferably 7 nm or more and 15 nm or less. The thickness of the second seed layer 42 is preferably 2 nm or more and 30 nm or less, more preferably 3 nm or more and 20 nm or less, and still more preferably 4 nm or more and 15 nm or less.

(Base Layer)

The base layer 5 represented by a reference sign 5 in FIG. 1 and the like is a long flexible nonmagnetic support, and mainly functions as a base layer of the magnetic recording medium. The base layer 5 is also referred to as a base film layer or a substrate, and is a film layer that imparts appropriate rigidity to the entire magnetic recording medium T.

The thickness of the base layer 5 is preferably 5.0 μm or less or less than 5.0 μm, 4.8 μm or less or less than 4.8 μm, 4.5 μm or less or less than 4.5 μm, more preferably 4.2 μm or less, still more preferably 3.6 μm or less, and further still more preferably 3.3 μm or less. Since the average thickness of the base layer 5 is within the above numerical range (for example, 5.0 μm or less), a recording capacity that can be recorded in one data cartridge can be increased as compared with a general magnetic recording medium. Note that a lower limit of the thickness of the base layer 5 may be determined from a viewpoint of a limit in film formation or the function of the base layer 5, but may be, for example, 2 μm or more, and particularly 2.5 μm or more.

The thickness of the base layer 5 can be determined as follows. First, a magnetic recording medium T1 having a width of ½ inches is prepared and cut into a length of 250 mm to prepare a sample. Subsequently, the layers other than the base layer 5 of the sample are removed with a solvent such as methyl ethyl ketone (MEK) or dilute hydrochloric acid. Next, the thickness of the sample (base layer 5) is measured at five or more points using a laser hologage manufactured by Mitutoyo Corporation as a measuring device, and the measured values are simply averaged (arithmetically averaged) to calculate an average thickness of the base layer 5. Note that the measurement points are randomly selected from the sample.

The base layer 5 may contain at least one selected from a polyester, a polyolefin, a cellulose derivative, a vinyl-based resin, and another polymer resin. In a case where the base layer 5 contains two or more selected from the above materials, the two or more materials may be mixed, copolymerized, or laminated. The polyester contains, for example, at least one selected from polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), and polyethylene bisphenoxycarboxylate. The polyolefin contains, for example, at least one selected from polyethylene (PE) and polypropylene (PP). The cellulose derivative contains, for example, at least one selected from cellulose diacetate, cellulose triacetate, cellulose acetate butyrate (CAB), and cellulose acetate propionate (CAP). The vinyl-based resin contains, for example, at least one selected from polyvinyl chloride (PVC) and polyvinylidene chloride (PVDC). The another polymer resin contains, for example, at least one selected from polyamide or nylon (PA), aromatic polyamide or aramid (aromatic PA), polyimide (PI), aromatic polyimide (aromatic PI), polyamide imide (PAI), aromatic polyamide imide (aromatic PAI), polybenzoxazole (PBO) such as ZYLON (registered trademark), polyether, polyether ketone (PEK), polyether ether ketone (PEEK), polyether ester, polyether sulfone (PES), polyether imide (PEI), polysulfone (PSF), polyphenylene sulfide (PPS), polycarbonate (PC), polyarylate (PAR), and polyurethane (PU).

Note that the description regarding the base layer also applies to other embodiments described below.

(Back Layer)

As illustrated in FIG. 1 and the like, the back layer 6 is formed on a lower main surface of the base layer 5. The back layer 6 plays a role of controlling friction generated when the magnetic recording medium T1 travels at a high speed while facing a magnetic head, a role of preventing winding disorder, and the like. That is, the back layer 6 plays a basic role for causing the magnetic recording medium T1 to travel stably at a high speed. The description regarding the back layer 6 also applies to all the embodiments described below.

The back layer 6 may contain a binder and nonmagnetic powder. The back layer 6 may further contain at least one additive selected from a lubricant, a curing agent, an antistatic agent, and the like as necessary. As the binder, a resin having a structure in which a crosslinking reaction is imparted to a polyurethane-based resin, a vinyl chloride-based resin, or the like is preferable. However, the binder is not limited to these resins, and other resins may be blended appropriately according to physical properties and the like required for the magnetic recording medium 10. Usually, a resin to be blended is not particularly limited as long as being generally used in the application type magnetic recording medium 10.

Examples of the binder include polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, an acrylate-vinylidene chloride copolymer, a methacrylate-vinylidene chloride copolymer, a methacrylate-vinyl chloride copolymer, a methacrylate-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, and a synthetic rubber.

Furthermore, as the binder, a thermosetting resin or a reactive resin may be used. Examples thereof include a phenol resin, an epoxy resin, a urea resin, a melamine resin, an alkyd resin, a silicone resin, a polyamine resin, and a urea formaldehyde resin.

Furthermore, in order to improve dispersibility of magnetic powder, a polar functional group such as —SO$_3$M, —OSO$_3$M, —COOM, or P=O(OM)$_2$ may be introduced into each of the above-described binders. Here, in the formulas, M represents a hydrogen atom or an alkali metal such as lithium, potassium, or sodium.

Moreover, examples of the polar functional group include a side chain type group having a terminal group of —NR1R2 or —NR1R2R3+X—, and a main chain type group of >NR1R2+X—. Here, R1, R2, and R3 in the formulas each represent a hydrogen atom or a hydrocarbon group, and X-represents an ion of a halogen element such as fluorine, chlorine, bromine, or iodine, or an inorganic or organic ion. Furthermore, examples of the polar functional group include —OH, —SH, —CN, and an epoxy group.

The nonmagnetic powder can contain, for example, at least one selected from inorganic particles and organic particles. One type of nonmagnetic powder may be used singly, or two or more types of nonmagnetic powder may be used in combination. The inorganic particles include, for example, one or a combination of two or more selected from a metal, a metal oxide, a metal carbonate, a metal sulfate, a metal nitride, a metal carbide, and a metal sulfide. More specifically, the inorganic particles can be one or more selected from, for example, iron oxyhydroxide, hematite, titanium oxide, and carbon black. Examples of the shape of the nonmagnetic powder include various shapes such as an acicular shape, a spherical shape, a cubic shape, and a plate shape, but are not particularly limited thereto.

The nonmagnetic powder that can be contained in the back layer 6 has an average particle size of preferably 10 nm or more and 150 nm or less, more preferably 15 nm or more and 110 nm or less. The average particle size of the nonmagnetic powder is determined in a similar manner to the above average particle size of the magnetic powder. The nonmagnetic powder may contain nonmagnetic powder having two or more particle size distributions.

As the curing agent, for example, polyisocyanate can be applied.

Examples of the polyisocyanate include an aromatic polyisocyanate such as an adduct of tolylene diisocyanate (TDI) and an active hydrogen compound, and an aliphatic polyisocyanate such as an adduct of hexamethylene diisocyanate (HMDI) and an active hydrogen compound.

The lubricant is similar to that in the case of the lubricant layer L described above. As the antistatic agent, a commercially available antistatic agent can be used, and when the antistatic agent is added to the back layer 6, adhesion of dust and dirt to the back layer 6 can be prevented.

An upper limit value of the thickness of the back layer 6 is preferably 0.6 µm or less. When the upper limit value of the thickness of the back layer 6 is 0.6 µm or less, even in a case where the thickness of the magnetic recording medium T is 5.6 µm or less, traveling stability of the magnetic recording medium T in a recording/reproducing device can be maintained. A lower limit value of the thickness of the back layer 6 is not particularly limited, but is, for example, 0.2 µm or more. When the lower limit value of the thickness of the back layer 6 is less than 0.2 µm, traveling stability of the magnetic recording medium T in a recording/reproducing device may be hindered.

The thickness of the back layer 6 is determined as follows. First, the magnetic recording medium T having a width of ½ inches is prepared and cut into a length of 250 mm to prepare a sample. Next, the thickness of the sample is measured at five or more points using a laser hologage manufactured by Mitsutoyo Corporation as a measuring device, and the measured values are simply averaged (arithmetically averaged) to calculate an average value $t_T$ [µm] of the magnetic recording medium T. Note that the measurement points are randomly selected from the sample.

Subsequently, the back layer 6 of the sample is removed with a solvent such as methyl ethyl ketone (MEK) or dilute hydrochloric acid. Thereafter, the thickness of the sample is measured again at five or more points using the above laser hologage, and the measured values are simply averaged (arithmetically averaged) to calculate an average value $t_B$ [µm] of the magnetic recording medium T from which the back layer 6 has been removed. Note that the measurement points are randomly selected from the sample. Thereafter, the thickness $t_b$ [µm] of the back layer 6 can be determined by a formula of $t_b$ [µm]=$t_T$ [µm]−$t_B$ [µM].

(3) Dimensions of Magnetic Recording Medium

The thickness (total thickness) $t_T$ of the magnetic recording medium T satisfies $t_T \le 5.6$ µm, and can be preferably 5.5 µm or less, and more preferably 5.3 µm or less, 5.2 µm or less, 5.0 µm or less, or 4.6 µm or less. Since the magnetic recording medium T is such a thin medium, for example, a tape length wound in one magnetic recording cartridge can be made longer, thereby increasing a recording capacity per magnetic recording cartridge. The thickness $t_T$ of the magnetic recording medium T may satisfy, for example, 3.0 µm$\le t_T$, and particularly 3.5 µm$\le t_T$.

The width of the magnetic recording medium T can be, for example, 5 mm to 30 mm, particularly 7 mm to 25 mm, more particularly 10 mm to 20 mm, and still more particularly 11 mm to 19 mm.

The length of the magnetic recording medium T may be, for example, 500 m to 1500 m, and may be, for example, 1000 m or more. For example, the tape width according to the LTO8 standard is 12.65 mm and the length according thereto is 960 m.

The thickness $t_T$ of the magnetic recording medium T is determined as follows. First, the magnetic recording medium T having a width of ½ inches is prepared and cut into a length of 250 mm to prepare a sample. Next, the thickness of the sample is measured at five or more points using a laser hologage (LGH-110C) manufactured by Mitutoyo Corporation as a measuring device, and the measured values are simply averaged (arithmetically averaged) to calculate an average thickness $t_T$ [μm]. Note that the measurement points are randomly selected from the sample.

(4) Configuration of Sputtering Device

Figure 8:
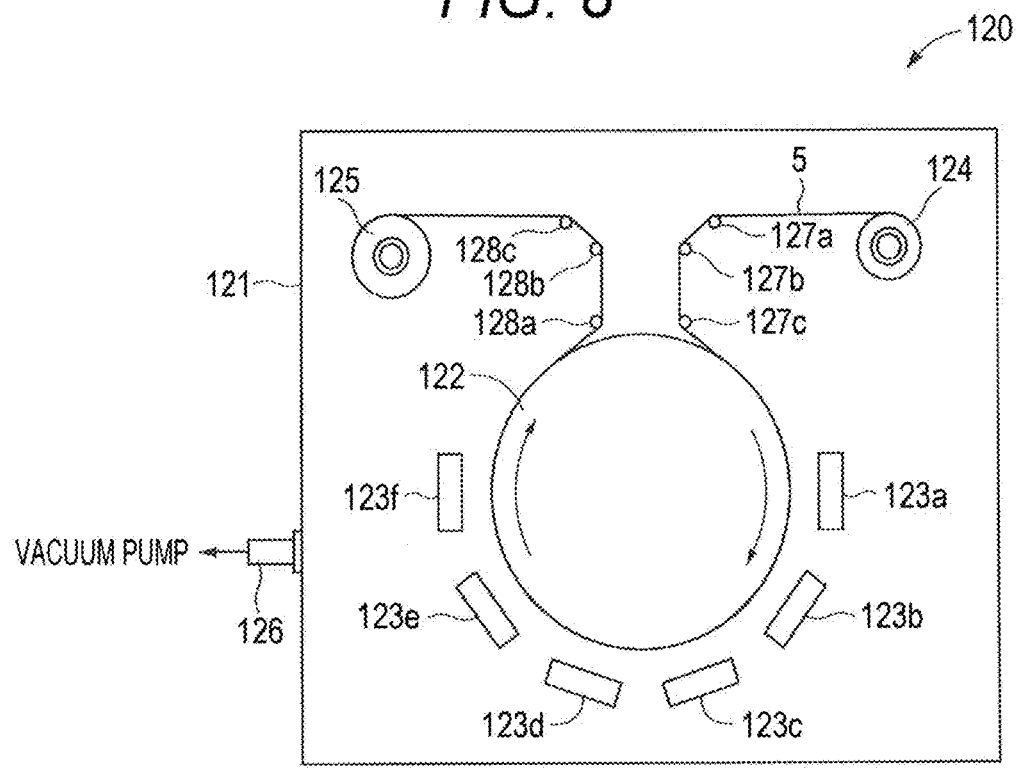
FIG. 8 is a schematic diagram illustrating a configuration of a sputtering device.

Hereinafter, an example of a configuration of a sputtering device 120 used for manufacturing the magnetic recording medium T according to the first embodiment will be described with reference to FIG. 8. The sputtering device 120 is a continuous winding type sputtering device used for forming the first seed layer 41, the second seed layer 42, the first ground layer 31, the second ground layer 32, and the recording layer 1, and includes a film forming chamber 121, a drum 122 which is a metal can (rotating body), cathodes 123a to 123f, a supply reel 124, a winding reel 125, and a plurality of guide rolls 127a to 127c and 128a to 128c as illustrated in FIG. 8. The sputtering device 120 is, for example, a device of a direct current (DC) magnetron sputtering method, but the sputtering method is not limited to this method.

The film forming chamber 121 is connected to a vacuum pump (not illustrated) via an exhaust port 126, and an atmosphere in the film forming chamber 121 is set to a predetermined degree of vacuum by the vacuum pump. Inside the film forming chamber 121, the rotatable drum 122, the supply reel 124, and the winding reel 125 are disposed. Inside the film forming chamber 121, the plurality of guide rolls 127a to 127c for guiding conveyance of the base layer 5 between the supply reel 124 and the drum 122 is disposed, and the plurality of guide rolls 128a to 128c for guiding conveyance of the base layer 5 between the drum 122 and the winding reel 125 is disposed. During sputtering, the base layer 5 unwound from the supply reel 124 is wound around the winding reel 125 via the guide rolls 127a to 127c, the drum 122, and the guide rolls 128a to 128c. The drum 122 has a cylindrical shape, and the long base layer 5 is conveyed along a cylindrical peripheral surface of the drum 122. The drum 122 includes a cooling mechanism (not illustrated), and is cooled to, for example, about −20° C. during sputtering. Inside the film forming chamber 121, the plurality of cathodes 123a to 123f is disposed so as to face the peripheral surface of the drum 122. Targets are set in these cathodes 123a to 123f, respectively. Specifically, targets for forming the second seed layer 42, the first seed layer 41, the second ground layer 32, the first ground layer 31, and the recording layer 1 are set in the 123b, 123c, 123d, 123e, and 123f, respectively. A plurality of types of films, that is, the second seed layer 42, the first seed layer 41, the second ground layer 32, the first ground layer 31, and the recording layer 1 are simultaneously formed by the cathodes 123b to 123f.

In the sputtering device 120 having the above-described configuration, the second seed layer 42, the first seed layer 41, the second ground layer 32, the first ground layer 31, and the recording layer 1 can be continuously formed by a roll-to-roll method.

(5) Method for Manufacturing Magnetic Recording Medium

The magnetic recording medium T according to the first embodiment can be manufactured, for example, as follows.

First, the second seed layer 42, the first seed layer 41, the second ground layer 32, the first ground layer 31, and the recording layer 1 are sequentially formed on a surface of the base layer 5 using the sputtering device 120 illustrated in FIG. 8. Specifically, the films are formed as follows. First, the film forming chamber 121 is evacuated until a predetermined pressure is reached. Thereafter, targets set in the cathodes 123b to 123f are sputtered while a process gas such as an Ar gas is introduced into the film forming chamber 121. Therefore, the second seed layer 42, the first seed layer 41, the second ground layer 32, the first ground layer 31, and the recording layer 1 are sequentially formed on a surface of the travelling base layer 5.

An atmosphere in the film forming chamber 121 during sputtering is set to, for example, about $1\times10^{-5}$ Pa to $5\times10^{-5}$ Pa. The thicknesses and characteristics of the second seed layer 42, the first seed layer 41, the second ground layer 32, the first ground layer 31, and the recording layer 1 can be controlled by adjusting a tape line speed for winding the base layer 5, a pressure of a process gas such as an Ar gas to be introduced during sputtering (sputter gas pressure), input power, and the like.

Next, the protective layer P is formed on the recording layer 1. As a method for forming the protective layer P, for example, a chemical vapor deposition (CVD) method or a physical vapor deposition (PVD) method can be used.

Next, a binder, inorganic particles, a lubricant, and the like are kneaded and dispersed in a solvent to prepare a back layer-forming coating material. Next, the back layer-forming coating material is applied onto a back surface of the base layer 5 and dried to form the back layer 6 on the back surface of the base layer 5.

Next, a lubricant is applied onto the protective layer P to form the lubricating layer L. As a method for applying the lubricant, for example, various application methods such as gravure coating and dip coating can be adopted. Next, the magnetic recording medium T is cut into a predetermined width as necessary. As a result, the magnetic recording medium T illustrated in FIG. 1 is obtained.

3. SECOND EMBODIMENT (1) Configuration of Magnetic Recording Medium

Figure 2:
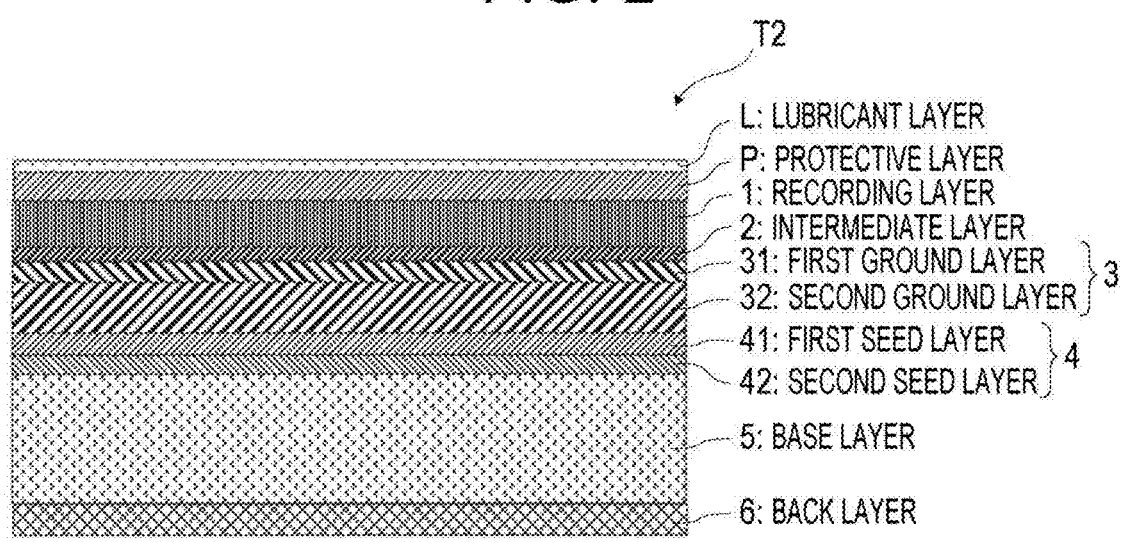
FIG. 2 is a diagram illustrating an example of a basic layer structure of a second embodiment.

A configuration of a magnetic recording medium T2 according to a second embodiment will be described with reference to FIG. 2. The magnetic recording medium T2 is, for example, a magnetic recording medium subjected to a vertical orientation treatment, and has a layer structure including an intermediate layer 2 between the recording layer 1 and the ground layer 3 as illustrated in FIG. 2. More specifically, the seed layer 42 and the seed layer 41 having a two-layer structure are sequentially laminated on one main surface of the base layer 5, the ground layers 31 and 32 having a two-layer structure are sequentially laminated immediately above the seed layer 41, the intermediate layer 2 is formed on the ground layer 31, the recording layer 1 functioning as a magnetic recording layer is formed on the intermediate layer 2, and the protective layer P and the lubricant layer L are formed on the recording layer 1. Then, a back layer 6 is formed on the other main surface of the base layer 5.

(2) Description of Each Layer

The lubricant layer L, the protective layer P, the recording layer 1, the ground layer 31, the ground layer 32, the seed layer 41, the seed layer 42, the base layer 5, and the back layer 6 each have a layer structure similar to that of the first embodiment.

(Intermediate Layer)

The intermediate layer represented by the reference sign 2 in FIG. 2 and the like mainly plays a role of enhancing orientation characteristics (granularity) of the above recording layer 1 formed immediately above the intermediate layer 2. The intermediate layer 2 preferably has a crystal structure similar to a main component of the recording layer 1 in contact with the intermediate layer 2. For example, in a case where the recording layer 1 contains a cobalt (Co)-based alloy, the intermediate layer 2 preferably contains a material having a hexagonal close-packed structure similar to that of the Co-based alloy, and the c-axis of the structure is preferably oriented in a direction perpendicular to a film surface (a thickness direction of a magnetic recording tape). Therefore, the crystal orientation characteristics of the recording layer 1 can be further enhanced, and matching between the intermediate layer 2 and the recording layer 1 in a lattice constant can be relatively favorable.

A material of the hexagonal close-packed structure adopted in the intermediate layer 2 preferably contains ruthenium. The material forming the intermediate layer 2 preferably contains a ruthenium (Ru) simple substance or an alloy thereof, and may contain a ruthenium simple substance or a ruthenium alloy. In a preferred embodiment of the present technology, the ruthenium alloy can preferably have an average atomic number ratio represented by the following formula (3):

$$[Ru_xCo_yCr_{100-x-y}]_{100-z}(MO_2)_z \quad (3)$$

(in formula (3), x satisfies 20≤x≤40, preferably 25≤x≤40, y satisfies 20≤y≤40, preferably 25≤y≤40, z satisfies 30≤z≤70, preferably 40≤z≤60, and M is Ti or Si.)

Furthermore, in another embodiment of the present technology, the ruthenium alloy may be, for example, a Ru alloy oxide such as RuCoCr(TiO₂), Ru—SiO₂, RuTiO₂, or Ru-ZrO₂.

However, the Ru material is a rare metal, and the intermediate layer 2 is preferably as thin as possible in terms of cost, preferably 6.0 nm or less, more preferably 5.0 nm or less, and still more preferably 2.0 nm or less. Alternatively, a configuration in which the intermediate layer 2 is completely eliminated (for example, the first embodiment example in FIG. 1) is more preferable in terms of cost.

In the second embodiment, since the ground layer 3 and the seed layer 4 described above are formed on the base layer 5, even in a case where the thickness of the intermediate layer 2 is reduced or even in a case where the intermediate layer 2 is not formed (the first embodiment, see FIG. 1, described above), a magnetic recording medium having a favorable SNR can be obtained.

Note that by utilizing "wettability" of the intermediate layer 2, when a material contained in the recording layer 1 formed on the intermediate layer 2 by vacuum film formation is crystallized, the material is easily diffused, and the column size of the crystal can be increased. For example, in order for the intermediate layer 2 containing Ru to exhibit wettability, the intermediate layer 2 requires a thickness of 0.5 nm or more. Note that the second embodiment example has a layer configuration corresponding to Examples 10 to 17 described later.

4. THIRD EMBODIMENT (1) Configuration of Magnetic Recording Medium

Figure 3:
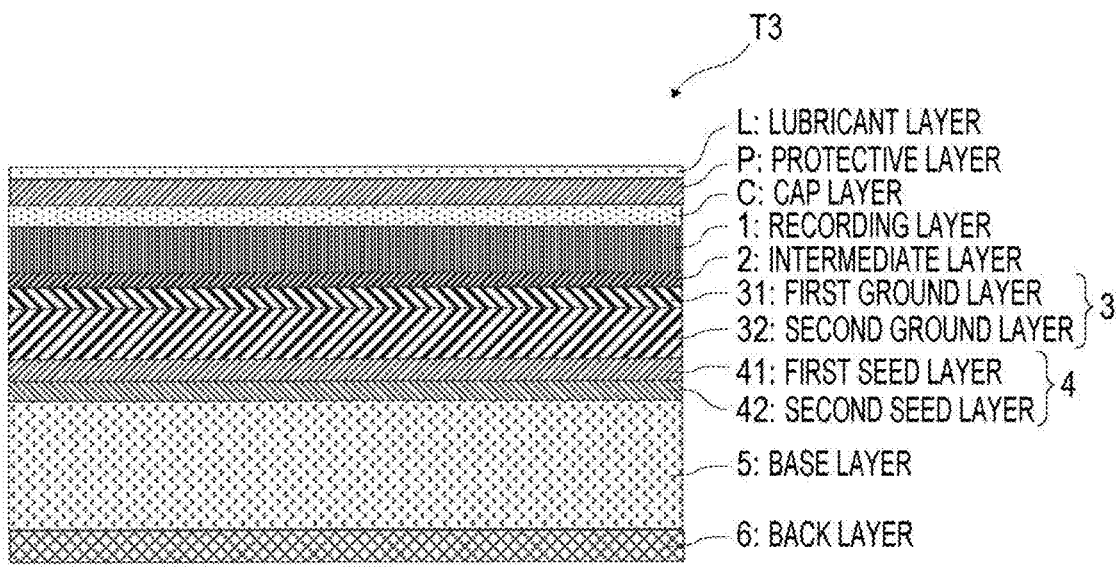
FIG. 3 is a diagram illustrating an example of a basic layer structure of a third embodiment.

A configuration of a magnetic recording medium T3 according to a third embodiment will be described with reference to FIG. 3. The magnetic recording medium T3 is, for example, a magnetic recording medium subjected to a vertical orientation treatment, and has the same film configuration as that in the first embodiment except for having a layer structure including the intermediate layer 2 and including a CAP layer (stack layer) immediately above the recording layer 1 as illustrated in FIG. 3. More specifically, the magnetic recording medium T3 further includes the CAP layer (stack layer) C between the recording layer 1 and the protective layer P. A laminated structure including the recording layer 1 having a granular structure and the CAP layer C is generally called coupled granular continuous (CGC).

(2) Description of Each Layer (Cap Layer)

The CAP layer C is a material having strong magnetic interaction, and can have a function of reducing a saturation recording magnetic field (Hs) to improve an SNR. The thickness of the CAP layer C is preferably 2 nm or more and 10 nm or less, more preferably 2 nm or more and 8 nm or less, still more preferably 2 nm or more and 7 nm or less, and further still more preferably 2 nm or more and 6 nm or less. By setting the thickness of the CAP layer C within the above numerical range, for example, by selecting the thickness of the CAP layer C within a range of 2 nm or more and 10 nm or less, better recording/reproducing characteristics can be obtained.

The CAP layer C may contain a CoPtCr-based material. Examples of the CoPtCr-based material include a CoPtCr material, a CoPtCrB material, and a material obtained by further adding a metal oxide to these materials (CoPtCr-metal oxide or CoPtCrB-metal oxide). As the metal oxide to be added, at least one selected from the group consisting of Si, Ti, Mg, Ta, and Cr can be used. Specific examples thereof include SiO₂, TiO₂, MgO, Ta₂O₅, Cr₂O₃, and a mixture of two or more types thereof.

The CAP layer C preferably has, for example, an average atomic number ratio represented by the following formula (7) or (8):

$$[Co_{100-x-y-z}Pt_xCr_yB_z] \quad (7)$$

(in formula (7), x satisfies 5≤x≤30, y satisfies 5≤y≤20, and z satisfies 0≤z≤15, preferably 10≤z≤30)

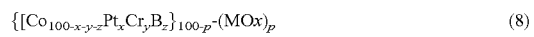

$$\{[Co_{100-x-y-z}Pt_xCr_yB_z]_{100-p}\text{-}(MOx)_p\} \quad (8)$$

(in formula (8), x satisfies 5≤x≤30, y satisfies 5≤y≤20, z satisfies 0≤z≤15, preferably 5≤z≤12, MOx represents the above metal oxide, and p satisfies 5≤p≤15.)

The lubricant layer L, the protective layer P, the recording layer 1, the intermediate layer 2, the ground layer 31, the ground layer 32, the seed layer 41, the seed layer 42, the base layer 5, and the back layer 6 may each have a layer structure similar to that of the first embodiment example, and the description in the first embodiment example also applies to the present embodiment. Note that the third embodiment example has a layer configuration corresponding to Examples 15 and 16 described later.

5. FOURTH EMBODIMENT (1) Configuration of Magnetic Recording Medium

Figure 4:
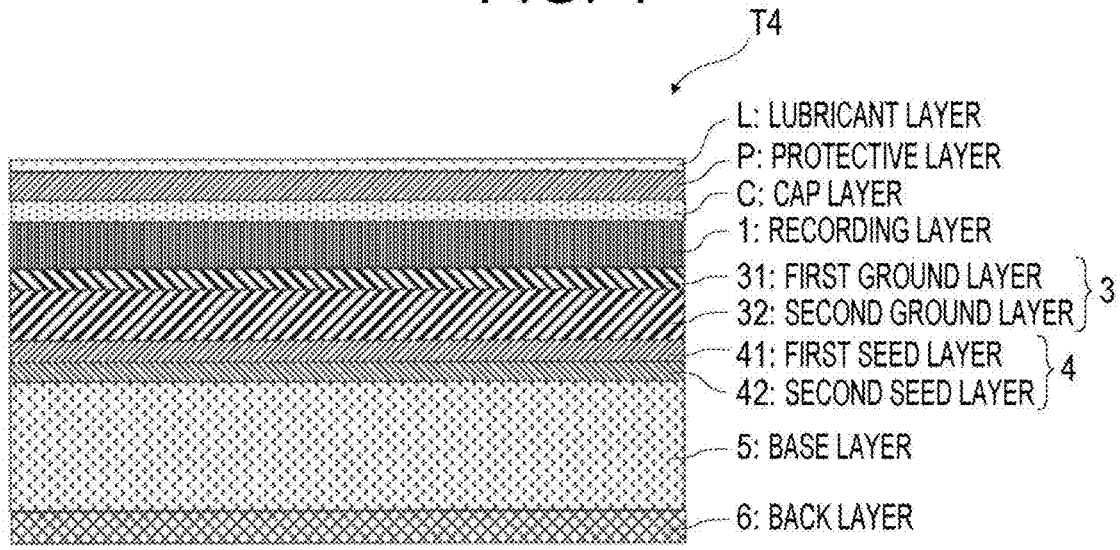
FIG. 4 is a diagram illustrating an example of a basic layer structure of a fourth embodiment.

A configuration of a magnetic recording medium T4 according to a fourth embodiment will be described with reference to FIG. 4. The magnetic recording medium T4 is, for example, a magnetic recording medium subjected to a vertical orientation treatment, and has the same layer configuration as that in the third embodiment except for not including the intermediate layer 2 as illustrated in FIG. 4.

6. FIFTH EMBODIMENT

(1) Configuration of Magnetic Recording Medium

A configuration of a magnetic recording medium T5 according to a fifth embodiment will be described with reference to FIG. 5. The magnetic recording medium T5 is, for example, a magnetic recording medium subjected to a vertical orientation treatment, and has the same film configuration as that in the third embodiment except for having a layer structure including a single soft magnetic underlayer (abbreviated as SUL) 7 between the second seed layer 42 and the base layer 5 as illustrated in FIG. 5.

(2) Description of Each Layer

The lubricant layer L, the protective layer P, the CAP layer C, the recording layer 1, the intermediate layer 2, the ground layer 31, the ground layer 32, the seed layer 41, the seed layer 42, the base layer 5, and the back layer 6 are similar to those in the first embodiment. Note that the fifth embodiment has a layer configuration corresponding to Example 17 described later.
(Soft Magnetic Underlayer (SUL))

Figure 5:
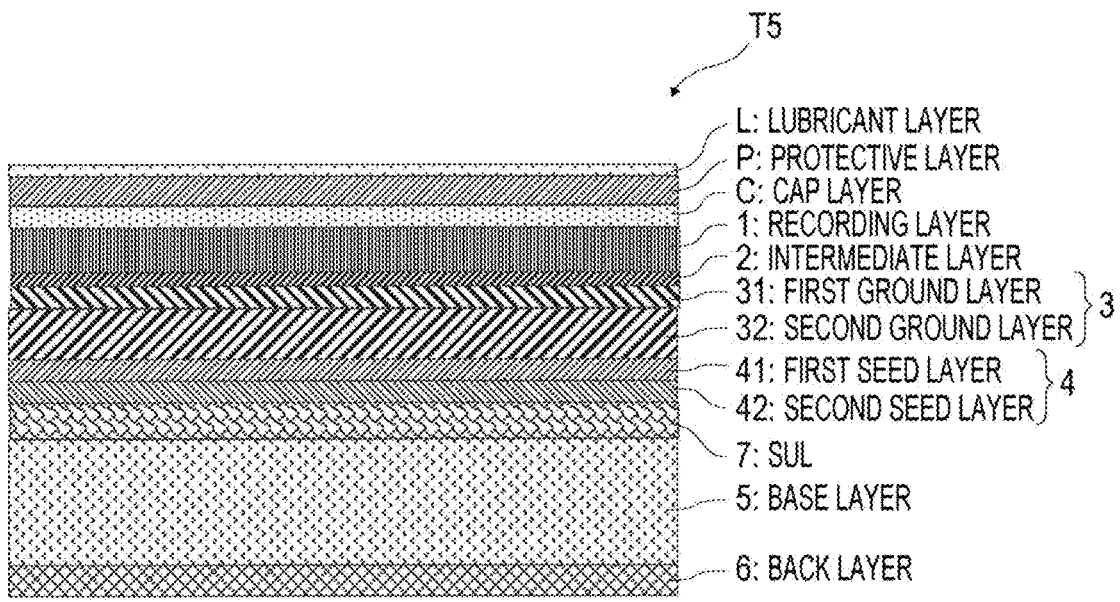
FIG. 5 is a diagram illustrating a basic layer structure of a fifth embodiment example.

The SUL represented by a reference sign 7 in FIG. 5 is a layer formed in order to efficiently draw a leakage flux generated from a perpendicular magnetic head into the recording layer 1 when magnetic recording is performed on the recording layer 1. That is, by forming the SUL 7, the magnetic field strength from the magnetic head can be increased, and a magnetic recording medium T suitable for higher density recording can be obtained. Note that the magnetic recording medium T including the SUL 7 can also be referred to as a "two-layer perpendicular magnetic recording medium".

The SUL 7 contains an amorphous soft magnetic material. For example, the SUL 7 can contain a CoZrNb alloy which is a Co-based material, and in addition, CoZrTa, CoZrTaNb, and the like can also be adopted. Furthermore, FeCoB, FeCoZr, FeCoTa, and the like, which are Fe-based materials, may be adopted. Note that the SUL 7 may include an antiparallel coupled SUL (APC-SUL) having a structure in which two soft magnetic layers are formed with a thin intervening layer interposed therebetween, and magnetization is positively antiparallel by utilizing an exchange bond via the intervening layer.

7. SIXTH EMBODIMENT

Figure 6:
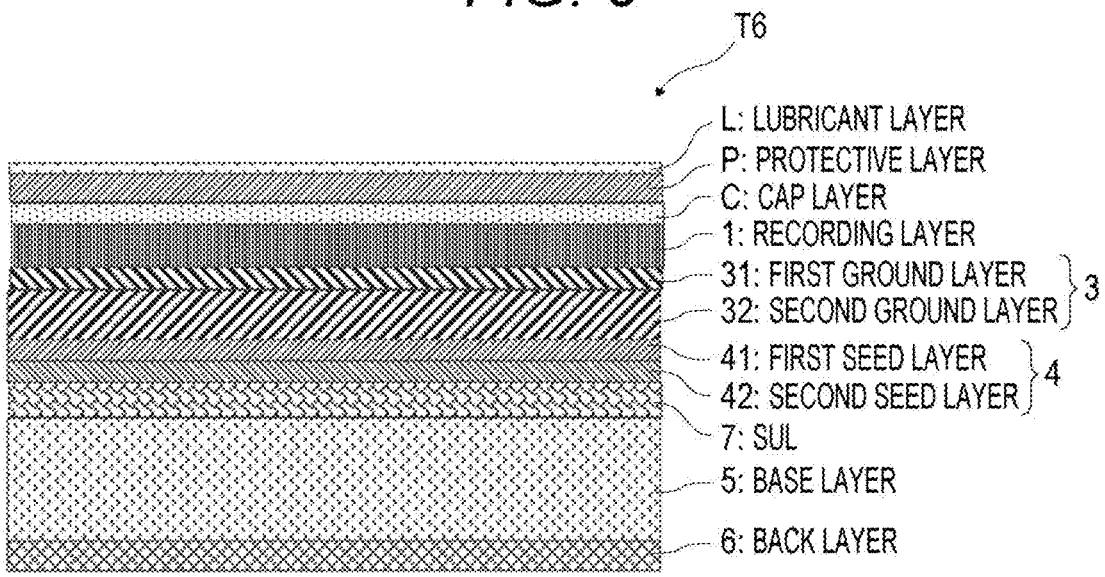
FIG. 6 is a diagram illustrating a basic layer structure of a sixth embodiment example.

(1) Configuration of Magnetic Recording Medium A configuration of a magnetic recording medium T6 according to a sixth embodiment will be described with reference to FIG. 6. The magnetic recording medium T6 has the same film configuration as that of the fifth embodiment except for not including the intermediate layer 2.

8. EXAMPLE OF METHOD FOR MANUFACTURING MAGNETIC RECORDING MEDIUM ACCORDING TO PRESENT TECHNOLOGY

The magnetic recording medium T according to the present technology can be manufactured, for example, as follows. First, the seed layer 4, the ground layer 3, the intermediate layer 2, and the recording layer 1 are sequentially formed by sputtering on one main surface of the base layer 5. An atmosphere in a film forming chamber during sputtering is set to, for example, about $1 \times 10^{-5}$ Pa to $5 \times 10^{-5}$ Pa. The thicknesses and characteristics (for example, magnetic characteristics) of the seed layer 4, the ground layer 3, the intermediate layer 2, and the recording layer 1 can be controlled by adjusting a tape line speed for winding a film constituting the base layer 5, a pressure of an argon (Ar) gas or the like to be introduced during sputtering (sputter gas pressure), input power, and the like.

Note that in the embodiment examples in which the intermediate layer 2 is not formed (see FIGS. 1 to 3), the recording layer 1 is formed immediately above the ground layer 3 without forming the intermediate layer 2. In a case where the seed layer 4 has a two-layer structure of the second seed layer 42 and the first seed layer 41, the films are sequentially formed. In a case where the ground layer 3 includes the second ground layer 32 and the first ground layer 31, the films are formed in this order.

Next, the protective layer P is formed on the oriented recording layer 1. As a method for forming the protective layer P, for example, a chemical vapor deposition (abbreviated as CVD) method or a physical vapor depositin (abbreviated as PVD) method can be used.

Next, a binder, inorganic particles, a lubricant, and the like are kneaded and dispersed in a solvent to prepare a coating material for the back layer 6, and the prepared coating material is applied onto the other main surface of the base layer 6 and dried to form the back layer 6.

Next, a lubricant is applied onto the protective layer P that has already been formed to form the lubricant layer L. As a method for applying the lubricant, for example, various application methods such as gravure coating and dip coating can be adopted, and the method for applying the lubricant is not particularly limited.

As a subsequent step, in order to adjust warpage of a magnetic tape in a tape width direction, a hot roll treatment for causing a raw fabric roll to travel while the raw fabric roll is in contact with a metal roll heated so as to have a surface temperature of about 150 to 230° C. may be performed.

The wide magnetic recording medium T obtained as described above is cut into, for example, a magnetic recording medium width conforming to the standard of the product type of the magnetic recording medium (cutting step). For example, the magnetic recording medium T is cut into a width of ½ inches (12.65 mm) and wound around a predetermined roll. Therefore, the long magnetic recording medium having a desired magnetic recording medium width can be obtained. In this cutting step, a necessary inspection may be performed.

Figure 10:
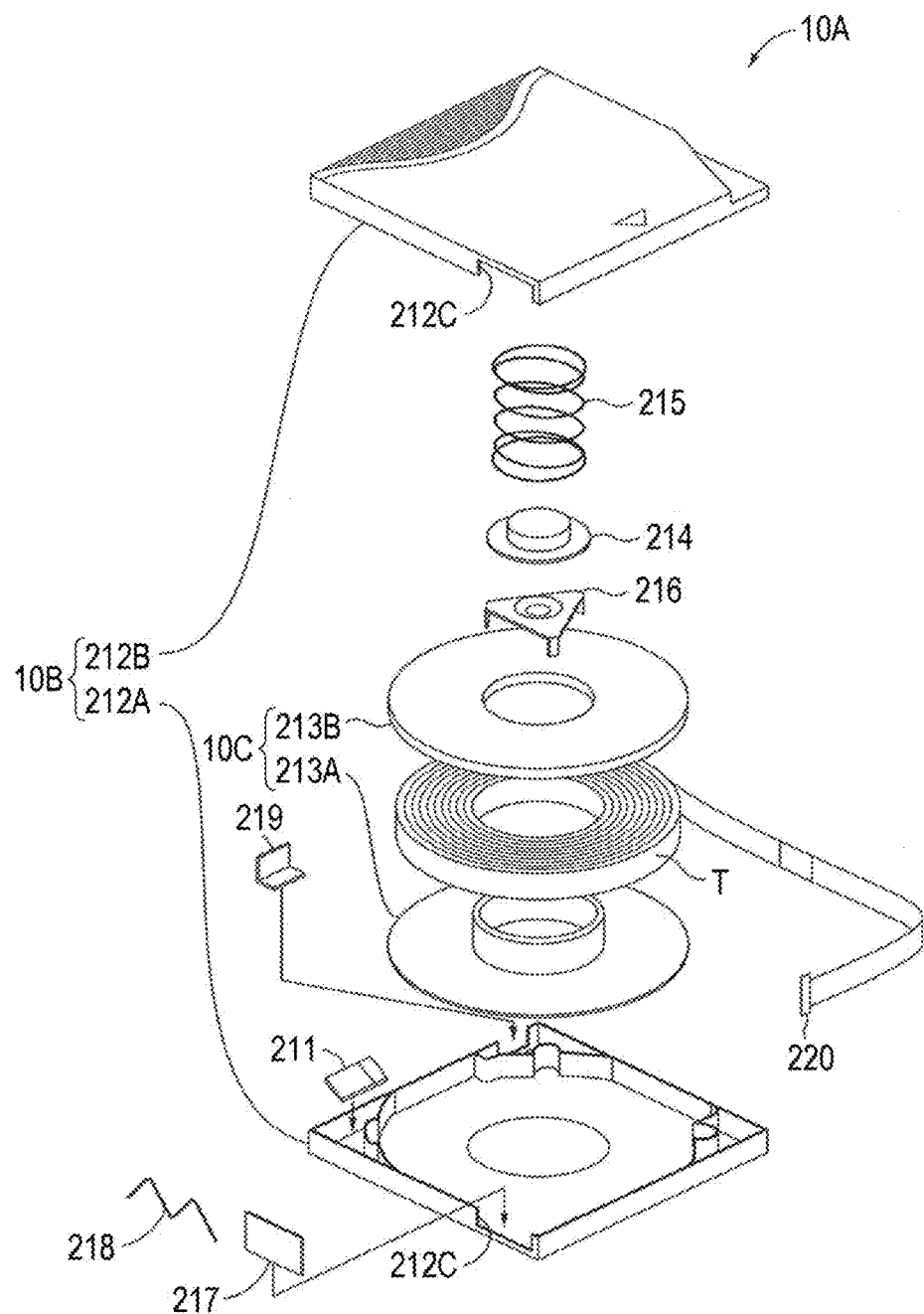
FIG. 10 is an exploded perspective view illustrating an example of a configuration of a magnetic recording cartridge.

Next, the magnetic recording medium cut into a predetermined width is cut into a predetermined length according to the product type to be formed into a form of a magnetic recording cartridge 10A as illustrated in FIG. 10. Specifically, the magnetic recording medium T having a predetermined length is wound around a reel 10C disposed in a cartridge case 10B and housed therein.

After a final product inspection step, the product is packaged and shipped. In the inspection step, for example, pre-shipment inspection for electromagnetic conversion characteristics, traveling durability, and the like is performed, and final quality confirmation of the magnetic recording medium is performed.

9. EMBODIMENT EXAMPLE OF RECORDING/REPRODUCING DEVICE ACCORDING TO PRESENT TECHNOLOGY

[Configuration of Recording/Reproducing Device]

Next, an example of a configuration of a recording/reproducing device 80 that performs recording and reproduction of the magnetic recording medium T having the configuration described above will be described with reference to FIG. 9. Note that the recording/reproducing device that performs recording and reproduction of the magnetic recording medium of the present technology is not limited to one having a configuration described below.

The recording/reproducing device 80 can adjust a tension applied to the magnetic recording medium T in a longitudinal direction thereof. Furthermore, the recording/reproducing device 80 can load the magnetic recording cartridge 10A thereon. Here, a case where the recording/reproducing device 80 can load one magnetic recording cartridge 10A thereon will be described in order to facilitate description. However, the recording/reproducing device 80 can load a plurality of the magnetic recording cartridges 10A thereon.

The recording/reproducing device 80 is connected to information processing devices such as a server 91 and a personal computer (hereinafter referred to as "PC") 92 via a network 93, and data supplied from these information processing devices can be recorded in the magnetic recording cartridge 10A. The shortest recording wavelength of the recording/reproducing device 80 is preferably 100 nm or less, more preferably 75 nm or less, still more preferably 60 nm or less, and particularly preferably 50 nm or less.

Figure 9:
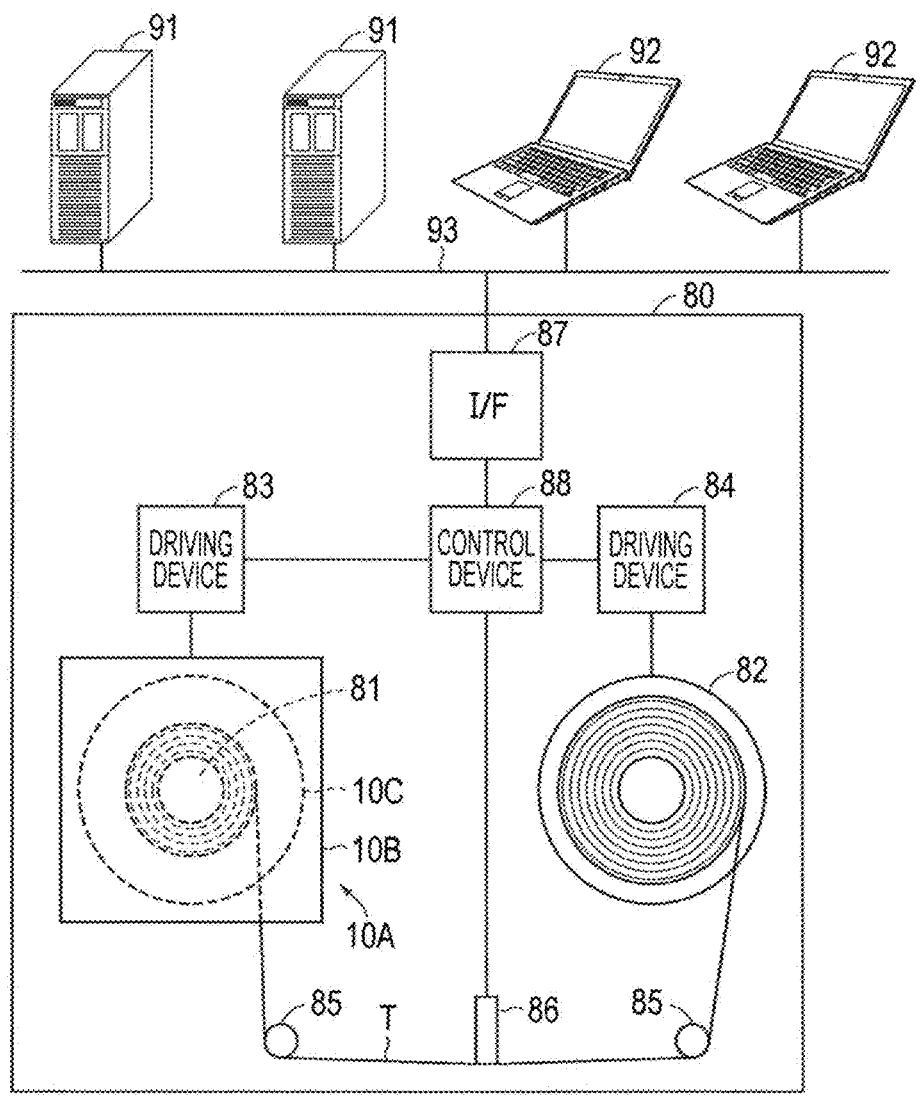
FIG. 9 is a schematic diagram illustrating a configuration of a recording/reproducing device.

As illustrated in FIG. 9, the recording/reproducing device 80 includes a spindle 81, a reel 82 on the recording/reproducing device side, a spindle driving device 83, a reel driving device 84, a plurality of guide rollers 85, a head unit 86, a communication interface (hereinafter, I/F) 87, and a control device 88.

The magnetic recording cartridge 10A can be mounted on the spindle 81. The magnetic recording cartridge 10A conforms to the linear tape open (LTO) standard, and rotatably houses the single reel 10C around which the magnetic recording medium T is wound in the cartridge case 10B. A V-shaped servo pattern is recorded in advance as a servo signal on the magnetic recording medium T. The reel 82 can fix a distal end of the magnetic recording medium T pulled out from the magnetic recording cartridge 10A.

The spindle driving device 83 is a device that rotationally drives the spindle 81. The reel driving device 84 is a device that rotationally drives the reel 82. When data is recorded or reproduced on the magnetic recording medium T, the spindle driving device 83 and the reel driving device 84 rotationally drive the spindle 81 and the reel 82 to cause the magnetic recording medium T to travel. The guide roller 85 is a roller for guiding traveling of the magnetic recording medium T.

The head unit 86 includes a plurality of recording heads for recording a data signal on the magnetic recording medium T, a plurality of reproducing heads for reproducing a data signal recorded on the magnetic recording medium T, and a plurality of servo heads for reproducing a servo signal recorded on the magnetic recording medium T. For example, a ring type head can be used as the recording head, but the type of the recording head is not limited thereto.

The communication I/F 87 is for communicating with an information processing device such as the server 91 or the PC 92, and is connected to the network 93.

The control device 88 controls the entire recording/reproducing device 80. For example, the control device 88 causes the head unit 86 to record a data signal supplied from an information processing device such as the server 91 or the PC 92 on the magnetic recording medium T in response to a request from the information processing device. Furthermore, the control device 88 causes the head unit 86 to reproduce a data signal recorded on the magnetic recording medium T in response to a request from an information processing device such as the server 91 or the PC 92 and supplies the data signal to the information processing device.

[Operation of Recording/Reproducing Device]

Next, operation of the recording/reproducing device 80 having the configuration described above will be described.

First, the magnetic recording cartridge 10A is mounted on the recording/reproducing device 80. A distal end of the magnetic recording medium T is pulled out, transferred to the reel 82 via the plurality of guide rollers 85 and the head unit 86, and attached to the reel 82.

Next, when an operation unit (not illustrated) is operated, the spindle driving device 83 and the reel driving device 84 are driven by control of the control device 88, and the spindle 81 and the reel 82 are rotated in the same direction such that the magnetic recording medium T travels from the reel 10C toward the reel 82. Therefore, while the magnetic recording medium T is wound around the reel 82, the head unit 86 records information on the magnetic recording medium T or reproduces information recorded on the magnetic recording medium T.

Furthermore, in a case where the magnetic recording medium T is rewound onto the reel 10C, the spindle 81 and the reel 82 are rotationally driven in the opposite direction to the direction described above, and the magnetic recording medium T thereby travels from the reel 82 to the reel 10C. Also during the rewinding, the head unit 86 records information on the magnetic recording medium T or reproduces information recorded on the magnetic recording medium T.

10. EMBODIMENT EXAMPLE OF MAGNETIC RECORDING CARTRIDGE ACCORDING TO PRESENT TECHNOLOGY

[Configuration of Cartridge]

The present technology also provides a magnetic recording cartridge (also referred to as a tape cartridge) including the magnetic recording medium according to the present technology. In the magnetic recording cartridge, the magnetic recording medium may be wound around a reel, for example. For example, the magnetic recording cartridge may include: a communication unit that communicates with a recording/reproducing device; a storage unit; and a control unit that stores information received from the recording/reproducing device via the communication unit in the storage unit, reads the information from the storage unit according to a request from the recording/reproducing device, and transmits the information to the recording/reproducing device via the communication unit. The information can include adjustment information for adjusting a tension applied to the magnetic recording medium in a longitudinal direction thereof.

An example of a configuration of the magnetic recording cartridge 10A including the magnetic recording medium T having the above-described configuration will be described with reference to FIG. 10.

FIG. 10 is an exploded perspective view illustrating an example of the configuration of the magnetic recording cartridge 10A. The magnetic recording cartridge 10A is a magnetic recording cartridge conforming to the linear tape-open (LTO) standard, and includes: inside the cartridge case 10B including a lower shell 212A and an upper shell 212B, the reel 10C around which a magnetic tape (tape-shaped magnetic recording medium) T is wound; a reel lock 214 and a reel spring 215 for locking rotation of the reel 10C; a spider 216 for releasing a locked state of the reel 10C; a slide door 217 that opens and closes a tape outlet 212C formed in the cartridge case 10B so as to straddle the lower shell 212A and the upper shell 212B; a door spring 218 that urges the slide door 217 to a closed position of the tape outlet 212C; a write protect 219 for preventing erroneous erasure; and a cartridge memory 211. The reel 10C has a substantially disk shape with an opening at the center, and includes a reel hub 213A and a flange 213B including a hard material such as plastic. A leader pin 220 is disposed at one end of a magnetic tape T.

The cartridge memory 211 is disposed near one corner of the magnetic recording cartridge 10A. The cartridge memory 211 faces a reader/writer (not illustrated) of the recording/reproducing device 80 in a state where the magnetic recording cartridge 10A is loaded on the recording/reproducing device 80. The cartridge memory 211 communicates with the recording/reproducing device 30, specifically, with a reader/writer (not illustrated) according to a wireless communication standard conforming to the LTO standard.

[Configuration of Cartridge Memory]

An example of a configuration of the cartridge memory 211 will be described with reference to FIG. 11.

Figure 11:
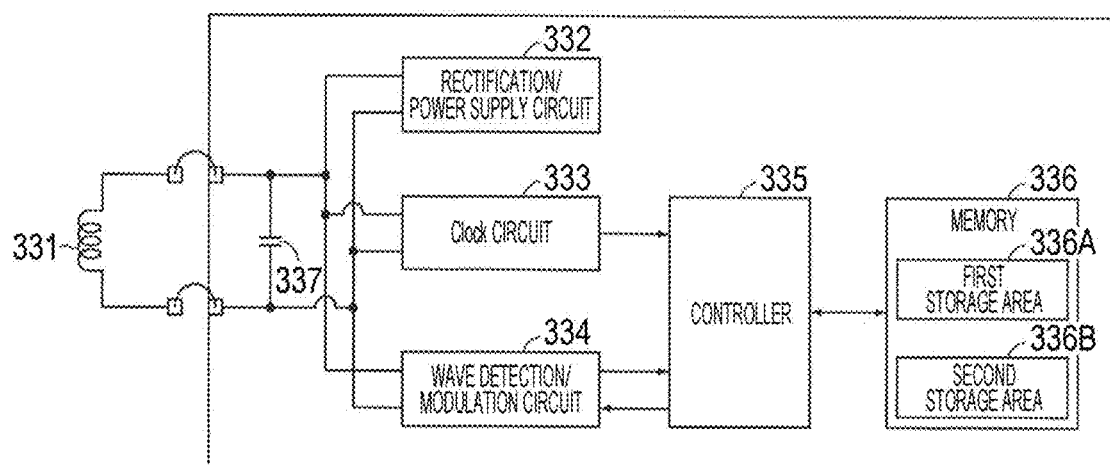
FIG. 11 is a block diagram illustrating an example of a configuration of a cartridge memory.

FIG. 11 is a block diagram illustrating an example of the configuration of the cartridge memory 211. The cartridge memory 211 includes: an antenna coil (communication unit) 331 that communicates with a reader/writer (not illustrated) according to a prescribed communication standard; a rectification/power supply circuit 332 that generates power using an induced electromotive force from a radio wave received by an antenna coil 331 and performs rectification to generate a power supply; a clock circuit 333 that generates a clock using an induced electromotive force similarly from the radio wave received by the antenna coil 331; a wave detection/modulation circuit 334 that performs wave detection of the radio wave received by the antenna coil 331 and modulation of a signal transmitted by the antenna coil 331; a controller (control unit) 335 including a logic circuit and the like for determining a command and data from a digital signal extracted from the wave detection/modulation circuit 334 and processing the command and data; and a memory (storage unit) 336 that stores information. Furthermore, the cartridge memory 211 includes a capacitor 337 connected in parallel to the antenna coil 331, and the antenna coil 331 and the capacitor 337 constitute a resonant circuit.

The memory 336 stores information and the like related to the magnetic recording cartridge 10A. The memory 336 is a non-volatile memory (NVM). The memory 336 preferably has a storage capacity of about 32 KB or more. For example, in a case where the magnetic recording cartridge 10A conforms to an LTO format standard of a next generation or later, the memory 336 has a storage capacity of about 32 KB.

The memory 336 has a first storage area 336A and a second storage area 336B. The first storage area 336A corresponds to a storage area of a cartridge memory conforming to an LTO standard prior to LTO 8 (hereinafter referred to as "conventional cartridge memory") and is an area for storing information conforming to an LTO standard prior to LTO 8. The information conforming to an LTO standard prior to LTO 8 is, for example, manufacturing information (for example, a unique number of the magnetic recording cartridge 10A) or a usage history (for example, the number of times of tape withdrawal (thread count)).

The second storage area 336B corresponds to an extended storage area for a storage area of the conventional cartridge memory. The second storage area 336B is an area for storing additional information. Here, the additional information means information related to the magnetic recording cartridge 10A, not prescribed by an LTO standard prior to LTO 8. Examples of the additional information include tension adjustment information, management ledger data, Index information, and thumbnail information of a moving image stored in the magnetic tape T, but are not limited to the data. The tension adjustment information includes a distance between adjacent servo bands (a distance between servo patterns recorded in adjacent servo bands) at the time of data recording on the magnetic tape T. The distance between the adjacent servo bands is an example of width-related information related to the width of the magnetic tape T. Details of the distance between the servo bands will be described later. In the following description, information stored in the first storage area 336A may be referred to as "first information", and information stored in the second storage area 336B may be referred to as "second information".

The memory 336 may have a plurality of banks. In this case, some of the plurality of banks may constitute the first storage area 336A, and the remaining banks may constitute the second storage area 336B. Specifically, for example, in a case where the magnetic recording cartridge 10A conforms to an LTO format standard of a next generation or later, the memory 336 may have two banks each having a storage capacity of about 16 KB. One of the two banks may constitute the first storage area 336A, and the other bank may constitute the second storage area 336B.

The antenna coil 331 induces an induced voltage by electromagnetic induction. The controller 335 communicates with the recording/reproducing device 80 according to a prescribed communication standard via the antenna coil 331. Specifically, for example, mutual authentication, transmission and reception of commands, and exchange of data are performed.

The controller 335 stores information received from the recording/reproducing device 80 via the antenna coil 331 in the memory 336. The controller 335 reads out information from the memory 336 in response to a request from the recording/reproducing device 80, and transmits the information to the recording/reproducing device 80 via the antenna coil 331.

11. MODIFICATION OF MAGNETIC RECORDING CARTRIDGE ACCORDING TO PRESENT TECHNOLOGY

[Configuration of Cartridge]

In one embodiment of the magnetic recording cartridge described above, a case where the magnetic tape cartridge is a one-reel type cartridge has been described, but the magnetic recording cartridge of the present technology may be a two-reel type cartridge. That is, the magnetic recording cartridge of the present technology may have one or a plurality of (for example, two) reels around which the magnetic tape is wound. Hereinafter, an example of the magnetic recording cartridge of the present technology having two reels will be described with reference to FIG. 12.

Figure 12:
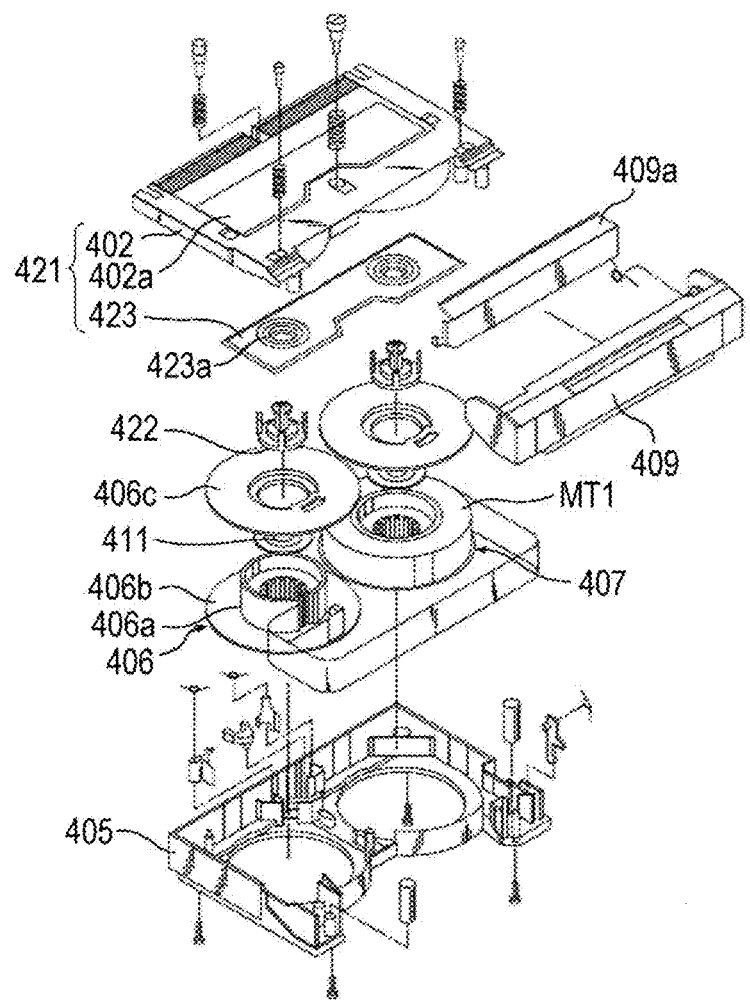
FIG. 12 is an exploded perspective view illustrating an example of a modification of a magnetic recording cartridge.

FIG. 12 is an exploded perspective view illustrating an example of a configuration of a two-reel type cartridge 421. The cartridge 421 includes: a synthetic resin upper half 402; a transparent window member 423 fitted and fixed to a window portion 402a opened on an upper surface of the upper half 402; a reel holder 422 fixed to an inner side of the upper half 402 and preventing uplift of reels 406 and 407; a lower half 405 corresponding to the upper half 402; the reels 406 and 407 stored in a space formed by combining the upper half 402 and the lower half 405; a magnetic tape MT1 wound around the reels 406 and 407; a front lid 409 closing a front side opening formed by combining the upper half 402 and the lower half 405; and a back lid 409A that protects the magnetic tape MT1 exposed to the front side opening.

The reel 406 includes: a lower flange 406b having a cylindrical hub 406a around which the magnetic tape MT1 is wound in a central portion; an upper flange 406c having substantially the same size as the lower flange 406b; and a reel plate 411 sandwiched between the hub 406a and the upper flange 406c. The reel 407 has a similar configuration to the reel 406.

In the window member 423, at positions corresponding to the reels 406 and 407, attachment holes 423a for assembling a reel holder 422 which is a reel holding means for preventing the reels from being lifted up are formed, respectively. The magnetic tape MT1 is similar to the magnetic tape T in the first embodiment.

The present technology can adopt the following configurations.

[1]

A magnetic recording medium having a layer structure including a recording layer, a ground layer, and a base layer in this order, in which
the ground layer includes a first ground layer on the recording layer side and a second ground layer on the base layer side, and
the first ground layer contains a nonmagnetic oxide, the first ground layer has a thickness of 2 nm or more and 10 nm or less, and the second ground layer has a thickness of 40 nm or more.

[2]

The magnetic recording medium according to [1], in which the nonmagnetic oxide is $SiO_2$ or $TiO_2$.

[3]

The magnetic recording medium according to [1] or [2], in which the first ground layer containing the nonmagnetic oxide contains a Co-based alloy having an average atomic number ratio represented by the following formula (1):

$$[Co_{(100-y)}Cr_y]_{(100-z)}(MO_2)_z \quad (1)$$

(in which y satisfies 35≤y≤45, z satisfies z≤10, and M is Si or Ti.)

[4]

The magnetic recording medium according to any one of [1] to [3], in which the second ground layer contains a Co-based alloy, and the Co-based alloy has an average atomic number ratio represented by the following formula (2):

$$Co_{(100-y)}Cr_y \quad (2)$$

(in which y satisfies 35≤y≤45).

The magnetic recording medium according to any one of [1] to [4], in which the second ground layer has a thickness of 40 nm or more and 100 nm or less. The magnetic recording medium according to any one of [1] to [5], in which the recording layer contains a nonmagnetic oxide, and the nonmagnetic oxide is $B_2O_3$.

[7]

The magnetic recording medium according to any one of [1] to [6], in which the recording layer contains a Co-based alloy particle, and X-ray relative intensity values of in-plane X-ray diffraction on a (11.0) plane and a (10.0) plane of the Co-based alloy particle satisfy the following relational formula:

$$\Delta I(11.0)/\Delta I(10.0) \geq 0.7$$

(in which $\Delta I(11.0)=|I(11.0)-I_{BG}(11.0)|$ and $\Delta I(10.0)=|I(10.0)-I_{BG}(10.0)|$. Note that I(11.0) represents an X-ray relative intensity value on the (11.0) plane, $I_{BG}(11.0)$ represents a background value of the X-ray relative intensity value on the (11.0) plane, I(10.0) represents an X-ray relative intensity value on the (10.0) plane, and $I_{BG}(10.0)$ represents a background value of the X-ray relative intensity value on the (10.0) plane).

[8]

The magnetic recording medium according to [7], in which the recording layer contains a Co-based alloy particle, and the X-ray relative intensity value of in-plane X-ray diffraction on the (10.0) plane of the Co-based alloy particle satisfies the following relational formula:

$$I(10.0)/I_{BG}(10.0) \geq 1.4$$

(in which I(10.0) represents an X-ray relative intensity value on the (10.0) plane, and $I_{BG}(10.0)$ represents a background value of the X-ray relative intensity value on the (10.0) plane).

[9]

The magnetic recording medium according to any one of [1] to [8], in which an intermediate layer containing ruthenium is formed between the recording layer and the first ground layer.

[10]

The magnetic recording medium according to [9], in which the intermediate layer contains a ruthenium simple substance or a ruthenium alloy.

[11]

The magnetic recording medium according to [10], in which the ruthenium alloy has an average atomic number ratio represented by the following formula (3):

$$[Ru_xCo_yCr_{100-x-y}]_{100-z}(MO_2)_z \quad (3)$$

(in the formula (3), x satisfies 10≤x≤60, y satisfies 20≤y≤40, z satisfies 5≤z≤20, and M is Ti or Si).

[12]

The magnetic recording medium according to any one of [1] to [11], including a seed layer between the ground layer and the base layer.

[13]

The magnetic recording medium according to [12], in which the seed layer includes a first seed layer on the ground layer side and a second seed layer on the base layer side.

[14]

The magnetic recording medium according to [13], in which the first seed layer contains a nickel-tungsten alloy.

[15]

The magnetic recording medium according to [14], in which the nickel-tungsten alloy has a composition of an average atomic number ratio represented by the following formula (4):

$$Ni_{(100-x)}W_x \quad (4)$$

(in which x satisfies 1×10).

[16]

The magnetic recording medium according to any one of [13] to [15], in which the second seed layer contains three atoms of Ti, Cr, and O, and has an average atomic number ratio represented by the following formula (5):

$$(Ti_{(100-y)}Cr_y)_{(100-y)}O_y \quad (5)$$

(in which x satisfies 30≤x≤70, and y satisfies y≤10).

[17]

The magnetic recording medium according to any one of [1] to [16], in which a thickness $t_T$ of the magnetic recording medium satisfies $t_T \leq 5.6$ μm.

The magnetic recording medium according to any one of [1] to [17], in which a thickness $t_m$ of the recording layer satisfies 10 nm $\leq t_m \leq$ 20 nm.

The magnetic recording medium according to any one of [1] to [18], in which the base layer has a thickness of 5.0 μm or less.

The magnetic recording medium according to any one of [1] to [19], including a back layer having a thickness $t_b$ satisfying $t_b \leq 0.6$ μm.

[22]

The magnetic recording medium according to any one of [1] to [20], having a squareness ratio of 65% or more in a perpendicular direction.

A magnetic recording cartridge including a magnetic recording medium having a layer structure including a recording layer, a ground layer, and a base layer in this order,
  the ground layer including a first ground layer on the recording layer side and a second ground layer on the base layer side,
  the first ground layer containing a nonmagnetic oxide, the first ground layer having a thickness of 2 nm or more and 10 nm or less, and the second ground layer having a thickness of 40 nm or more, in which
  the magnetic recording medium is housed in a state of being wounded around a reel.

EXAMPLES

Hereinafter, the present technology will be described more specifically with Examples, but the present technology is not limited only to these Examples.

In the present Examples, the thickness of each of a seed layer, a ground layer, an intermediate layer, a recording layer, and a protective layer was determined as follows. First, a magnetic tape which is a magnetic medium was thinly processed in a film cross-sectional direction thereof to prepare a sample piece. Next, the sample piece was observed with a transmission electron microscope (hereinafter referred to as "TEM"), and the thickness of each of the layers was measured from the TEM image.

Furthermore, in the present Examples, an average atomic number ratio of the seed layer or the like was determined as follows. First, the magnetic tape was ion-milled, and depth direction analysis (depth profile measurement) of the seed layer was performed by AES. Next, an average atomic number ratio (average composition) in a thickness direction was determined from the obtained depth profile.

Measurement conditions of AES are as follows.
  Device name: PHI-710 type manufactured by ULVAC-PHI, Inc.
  Electron gun acceleration voltage: 10 KV
  Etching gas: Ar gas
  Etching rate: several to several tens of nm/min. (in terms of SiO2 film)
  Spot diameter: about 30 nmφ
  Sputtering area: several to several tens of μm square
  Number of samples for data averaging: any one piece of data obtained by analyzing a measurement point several times (confirming reproducibility)

Example 1

(Second Seed Layer Forming Step)
First, under the following film forming conditions, a seed layer containing $(TiCr)_{(100-x)}O_x$ (in which x=2) was formed by sputtering on a surface of a long polymer film forming a nonmagnetic base layer so as to have a thickness of 2 nm.
  Film forming method: DC magnetron sputtering method
  Target: Ti target
  Type of gas: Ar
  Gas pressure: 0.25 Pa
  Input power: 0.1 W/mm$^2$
(First Seed Layer Forming Step)
A first seed layer containing $Ni_{94}W_6$ was formed by sputtering on the second seed layer so as to have a thickness of 5 nm.
  Film forming method: DC magnetron sputtering method
  Target: NiW target
  Type of gas: Ar
  Gas pressure: 0.25 Pa
  Input power: 0.03 W/mm$^2$
(Second Ground Layer Forming Step)
Next, under the following film forming conditions, a second ground layer containing $Co_{(100-y)}Cr_y$ (in which y=40) was formed by sputtering on the first seed layer so as to have a thickness of 40 nm.
  Film forming method: DC magnetron sputtering method
  Target: CoCr target
  Type of gas: Ar
  Gas pressure: 0.2 Pa
  Input power: 0.13 W/mm$^2$
  Mask: None
(First Ground Layer Forming Step)
Next, under the following film forming conditions, a first ground layer containing $[Co_{(100-y)}Cr_y]_{(100-z)}(SiO_2)_z$ (in which y=40 and z=4) was formed by sputtering on the second ground layer so as to have a thickness of 10 nm.
  Target: CoCrSiO$_2$ target
  Type of gas: Ar
  Gas pressure: 6 Pa
  Input power: 0.13 W/mm$^2$
  Mask: None
(Recording Layer Forming Step)
Next, under the following film forming conditions, a recording layer containing (CoCrPt)—(SiO$_2$) was formed by sputtering on the first ground layer so as to have a thickness of 14 nm.
  Film forming method: DC magnetron sputtering method
  Target: (CoCrPt)—(SiO$_2$) target
  Type of gas: Ar
  Gas pressure: 1.5 Pa
(Protective Layer Forming Step)
Next, under the following film forming conditions, a carbon protective layer was formed by sputtering on the recording layer so as to have a thickness of 5 nm.
  Film forming method: DC magnetron sputtering method
  Target: carbon target
  Type of gas: Ar
  Gas pressure: 1.0 Pa
(Lubricant Layer Forming Step)
Next, a prepared lubricant coating material was applied onto the protective layer to form a lubricant layer. Note that the lubricant coating material was prepared by mixing 0.11% by mass of a carboxylic acid perfluoroalkyl ester and 0.06% by mass of a fluoroalkyldicarboxylic acid derivative with a general-purpose solvent.

(Back Layer Forming Step)

Next, a back layer-forming coating material was applied onto the other main surface of the polymer film forming the base layer and dried to form a back layer. More specifically, a back layer containing nonmagnetic powder containing carbon and calcium carbonate and a polyurethane-based binder was formed so as to have a thickness of 0.3 μm. As a result, a target magnetic recording tape was obtained (see again FIG. 1 for the entire layer configuration).

Example 2

A magnetic recording tape was obtained in a similar manner to Example 1 described above except that the thickness of the second ground layer was changed to 50 nm.

Example 3

A magnetic recording tape was obtained in a similar manner to Example 1 described above except that the thickness of the first ground layer was changed to 5 nm.

Example 4

A magnetic recording tape was obtained in a similar manner to Example 1 described above except that the thickness of the second ground layer was changed to 45 nm.

Example 5

A magnetic recording tape was obtained in a similar manner to Example 1 described above except that the thickness of the second ground layer was changed to 50 nm.

Example 6

A magnetic recording tape was obtained in a similar manner to Example 1 described above except that the first ground layer was changed to a layer containing $[Co_{(100-y)}Cr_y]_{(100-z)}(TiO_2)_z$ (in which y=40 and z=4), the thickness of the first ground layer was changed to 5 nm, and the thickness of the second ground layer was changed to 45 nm.

Example 7

A magnetic recording tape was obtained in a similar manner to Example 1 described above except that, under the following film forming conditions, a recording layer containing $(CoCrPt)-(B_2O_3)$ was formed on the first ground layer so as to have a thickness of 14 nm, the thickness of the first ground layer was changed to 5 nm, and the thickness of the second ground layer was changed to 45 nm.
  Film forming method: DC magnetron sputtering method
  Target: $(CoCrPt)-(B_2O_3)$ target
  Type of gas: Ar
  Gas pressure: 1.5 Pa Example 8

A magnetic recording tape was obtained in a similar manner to Example 1 described above except that, under the same film forming conditions as those in Example 7 described above, a recording layer containing $(CoCrPt)-(B_2O_3)$ was formed on the first ground layer so as to have a thickness of 14 nm, the first ground layer was changed to a layer containing $[Co_{(100-y)}Cr_y]_{(100-z)}(TiO_2)_z$ (in which y=40 and z=4), the thickness of the first ground layer was changed to 5 nm, and the thickness of the second ground layer was changed to 45 nm.

Example 9

A magnetic recording tape was obtained in a similar manner to Example 1 described above except that the thickness of the first ground layer was changed to 2 nm. Note that a basic layer configuration corresponding to Examples 1 to 9 described above corresponds to FIG. 1 (see FIG. 1 again).

Example 10

A magnetic recording tape was obtained in a similar manner to Example 1 described above except that, under the following film forming conditions, an intermediate layer containing Ru was formed on the first ground layer so as to have a thickness of 2 nm, the thickness of the first ground layer was changed to 5 nm, and the thickness of the second ground layer was changed to 45 nm.
  Film forming method: DC magnetron sputtering method
  Target: Ru target
  Type of gas: Ar
  Gas pressure: 0.5 Pa Example 11

A magnetic recording tape was obtained in a similar manner to Example 1 described above except that, under the following film forming conditions, an intermediate layer containing $(CoCrRu)-(TiO_2)$ was formed on the first ground layer so as to have a thickness of 2 nm, the thickness of the first ground layer was changed to 5 nm, and the thickness of the second ground layer was changed to 45 nm.
  Film forming method: DC magnetron sputtering method
  Target: $(CoCrRu)-(TiO_2)$ target
  Type of gas: Ar
  Gas pressure: 0.5 Pa Example 12

A magnetic recording tape was obtained in a similar manner to Example 1 described above except that, under the same film forming conditions as those in Example 11 described above, an intermediate layer containing $(CoCrRu)-(TiO_2)$ was formed on the first ground layer so as to have a thickness of 2 nm, the first ground layer was changed to a layer containing $[Co_{(102-y)}Cr_y]_{(100-z)}(TiO_2)_z$ (in which y=40 and z=4), the thickness of the first ground layer was changed to 5 nm, and the thickness of the second ground layer was changed to 45 nm.

Example 13

A magnetic recording tape was obtained in a similar manner to Example 1 described above except that, under the same film forming conditions as those in Example 11 described above, an intermediate layer containing $(CoCrRu)-(TiO_2)$ was formed on the first ground layer so as to have a thickness of 2 nm, under the following film forming conditions, a recording layer containing $(CoCrPt)-(B_2O_3)$ was formed on the intermediate layer so as to have a thickness of 14 nm, the first ground layer was changed to a layer containing $[Co_{(100-y)}Cr_y]_{(100-z)}(TiO_2)_z$ (in which y=40 and z=4), the thickness of the first ground layer was changed to 5 nm, and the thickness of the second ground layer was changed to 45 nm.

Film forming method: DC magnetron sputtering method
Target: (CoCrPt)—(B$_2$O$_3$) target
Type of gas: Ar
Gas pressure: 1.5 Pa Example 14

A magnetic recording tape was obtained in a similar manner to Example 1 described above except that, under the same film forming conditions as those in Example 11 described above, an intermediate layer containing (CoCrRu)—(TiO$_2$) was formed on the first ground layer so as to have a thickness of 2 nm, under the same film forming conditions as those in Example 13 described above, a recording layer containing (CoCrPt)—(B$_2$O$_3$) was formed on the intermediate layer so as to have a thickness of 14 nm, the thickness of the first ground layer was changed to 5 nm, and the thickness of the second ground layer was changed to 45 nm. Note that a basic layer configuration corresponding to Examples 10 to 14 described above corresponds to FIG. 4 (see FIG. 4 again).

Example 15

A magnetic recording tape was obtained in a similar manner to Example 1 described above except that, under the same film forming conditions as those in Example 11 described above, an intermediate layer containing (CoCrRu)—(TiO$_2$) was formed on the first ground layer so as to have a thickness of 2 nm, under the same film forming conditions as those in Example 13 described above, a recording layer containing (CoCrPt)—(B$_2$O$_3$) was formed on the intermediate layer so as to have a thickness of 14 nm, under the following film forming conditions, a CoPtCrB layer (CAP layer) was formed between the recording layer and the protective layer so as to have a thickness of 2 nm, the first ground layer was changed to a layer containing [Co$_{(100-y)}$Cr$_y$]$_{(100-z)}$ (TiO$_2$)$_z$ (in which y=40 and z=4), the thickness of the first ground layer was changed to 5 nm, and the thickness of the second ground layer was changed to 45 nm. This Example corresponds to the third embodiment described with reference to FIG. 3.

Film forming method: DC magnetron sputtering method
Target: CoPtCrB target
Type of gas: Ar
Gas pressure: 0.5 Pa Example 16

A magnetic recording tape was obtained in a similar manner to Example 1 described above except that, under the same film forming conditions as those in Example 11 described above, an intermediate layer containing (CoCrRu)—(TiO$_2$) was formed on the first ground layer so as to have a thickness of 2 μm, under the same film forming conditions as those in Example 13 described above, a recording layer containing (CoCrPt)—(B$_2$O$_3$) was formed on the intermediate layer so as to have a thickness of 14 nm, under the same film forming conditions as those in Example 15 described above, a CoPtCrB layer (CAP layer) was formed between the recording layer and the protective layer so as to have a thickness of 2 nm, the thickness of the first ground layer was changed to 5 nm, and the thickness of the second ground layer was changed to 45 nm. Note that a basic layer configuration corresponding to Examples 15 and 16 described above corresponds to FIG. 5 (see FIG. 5 again).

Example 17

A magnetic recording tape was obtained in a similar manner to Example 16 described above except that, under the following film forming conditions, a CoZrNb alloy soft magnetic underlayer was formed between the seed layer and the base layer so as to have a thickness of 30 nm. Note that a basic layer configuration corresponding to Example 17 described above corresponds to FIG. 6 (see FIG. 6 again).

Film forming method: DC magnetron sputtering method
Target: CoZrNb target
Type of gas: Ar
Gas pressure: 0.5 Pa Comparative Example 1

A magnetic recording tape was obtained in a similar manner to Example 1 described above except that the thickness of the first ground layer was increased from 10 nm to 20 nm and the thickness of the second ground layer was decreased from 40 nm to 30 nm.

Comparative Example 2

A magnetic recording tape was obtained in a similar manner to Example 1 described above except that the thickness of the first ground layer was increased from 10 nm to 20 nm.

Comparative Example 3

A magnetic recording tape was obtained in a similar manner to Example 1 described above except that the thickness of the first ground layer was increased from 10 nm to 20 nm and the thickness of the second ground layer was increased from 40 nm to 50 nm.

Comparative Example 4

A magnetic recording tape was obtained in a similar manner to Example 1 described above except that the thickness of the first ground layer was increased from 10 nm to 15 nm and the thickness of the second ground layer was decreased from 40 nm to 30 nm.

Comparative Example 5

A magnetic recording tape was obtained in a similar manner to Example 1 described above except that the thickness of the first ground layer was increased from 10 nm to 15 nm.

Comparative Example 6

A magnetic recording tape was obtained in a similar manner to Example 1 described above except that the thickness of the first ground layer was increased from 10 nm to 15 nm and the thickness of the second ground layer was increased from 40 nm to 50 nm.

Comparative Example 7

A magnetic recording tape was obtained in a similar manner to Example 1 described above except that the thickness of the second ground layer was decreased from 40 nm to 30 nm.

Comparative Example 8

A magnetic recording tape was obtained in a similar manner to Example 1 described above except that the thickness of the first ground layer was decreased from 10 nm to 5 nm and the thickness of the second ground layer was decreased from 40 nm to 30 nm.

Comparative Example 9

A magnetic recording tape was obtained in a similar manner to Example 1 described above except that the thickness of the first ground layer was decreased from 10 nm to 5 nm and the thickness of the second ground layer was decreased from 40 nm to 35 nm.

Comparative Example 10

A magnetic recording tape was obtained in a similar manner to Example 1 described above except that the first ground layer was not formed.

Comparative Example 11

A magnetic recording tape was obtained in a similar manner to Example 1 described above except that the thickness of the first ground layer was decreased from 10 nm to 1 nm.

Layer configurations of Example 1 to 17 and Comparative Example 1 to 11 described above are summarized in the following "Table 1".

TABLE 1

| | CAP layer | | Recording layer | | Intermediate layer | | Ground layer | | | |
|---|---|---|---|---|---|---|---|---|---|---|
| | | | | | | | First ground layer | | Second ground layer | |
| | Material | Thickness (nm) | Magnetic material | Thickness (nm) | Material | Thickness (nm) | Material | Thickness (nm) | Material | Thickness (nm) |
| Example 1 | — | — | CoPtCr—SiO$_2$ | 14 | — | — | [Co$_{60}$Cr$_{40}$]$_{96}$(SiO$_2$)$_4$ | 10 | Co$_{60}$Cr$_{40}$ | 40 |
| Example 2 | — | — | CoPtCr—SiO$_2$ | 14 | — | — | [Co$_{60}$Cr$_{40}$]$_{96}$(SiO$_2$)$_4$ | 10 | Co$_{60}$Cr$_{40}$ | 50 |
| Example 3 | — | — | CoPtCr—SiO$_2$ | 14 | — | — | [Co$_{60}$Cr$_{40}$]$_{96}$(SiO$_2$)$_4$ | 5 | Co$_{60}$Cr$_{40}$ | 40 |
| Example 4 | — | — | CoPtCr—SiO$_2$ | 14 | — | — | [Co$_{60}$Cr$_{40}$]$_{96}$(SiO$_2$)$_4$ | 5 | Co$_{60}$Cr$_{40}$ | 45 |
| Example 5 | — | — | CoPtCr—SiO$_2$ | 14 | — | — | [Co$_{60}$Cr$_{40}$]$_{96}$(SiO$_2$)$_4$ | 5 | Co$_{60}$Cr$_{40}$ | 50 |
| Example 6 | — | — | CoPtCr—SiO$_2$ | 14 | — | — | [Co$_{60}$Cr$_{40}$]$_{96}$(TiO$_2$)$_4$ | 5 | Co$_{60}$Cr$_{40}$ | 45 |
| Example 7 | — | — | CoPtCr—B$_2$O$_3$ | 14 | — | — | [Co$_{60}$Cr$_{40}$]$_{96}$(SiO$_2$)$_4$ | 5 | Co$_{60}$Cr$_{40}$ | 45 |
| Example 8 | — | — | CoPtCr—B$_2$O$_3$ | 14 | — | — | [Co$_{60}$Cr$_{40}$]$_{96}$(TiO$_2$)$_4$ | 5 | Co$_{60}$Cr$_{40}$ | 45 |
| Example 9 | — | — | CoPtCr—SiO$_2$ | 14 | — | — | [Co$_{60}$Cr$_{40}$]$_{96}$(SiO$_2$)$_4$ | 2 | Co$_{60}$Cr$_{40}$ | 40 |
| Example 10 | — | — | CoPtCr—SiO$_2$ | 14 | Ru | 2 | [Co$_{60}$Cr$_{40}$]$_{96}$(SiO$_2$)$_4$ | 5 | Co$_{60}$Cr$_{40}$ | 45 |
| Example 11 | — | — | CoPtCr—SiO$_2$ | 14 | RuCoCr(TiO$_2$) | 2 | [Co$_{60}$Cr$_{40}$]$_{96}$(SiO$_2$)$_4$ | 5 | Co$_{60}$Cr$_{40}$ | 45 |
| Example 12 | — | — | CoPtCr—SiO$_2$ | 14 | RuCoCr(TiO$_2$) | 2 | [Co$_{60}$Cr$_{40}$]$_{96}$(TiO$_2$)$_4$ | 5 | Co$_{60}$Cr$_{40}$ | 45 |
| Example 13 | — | — | CoPtCr—B$_2$O$_3$ | 14 | RuCoCr(TiO$_2$) | 2 | [Co$_{60}$Cr$_{40}$]$_{96}$(TiO$_2$)$_4$ | 5 | Co$_{60}$Cr$_{40}$ | 45 |
| Example 14 | — | — | CoPtCr—B$_2$O$_3$ | 14 | RuCoCr(TiO$_2$) | 2 | [Co$_{60}$Cr$_{40}$]$_{96}$(SiO$_2$)$_4$ | 5 | Co$_{60}$Cr$_{40}$ | 45 |
| Example 15 | CPCB | 2 | CoPtCr—B$_2$O$_3$ | 14 | RuCoCr(TiO$_2$) | 2 | [Co$_{60}$Cr$_{40}$]$_{96}$(TiO$_2$)$_4$ | 5 | Co$_{60}$Cr$_{40}$ | 45 |
| Example 16 | CPCB | 2 | CoPtCr—B$_2$O$_3$ | 14 | RuCoCr(TiO$_2$) | 2 | [Co$_{60}$Cr$_{40}$]$_{96}$(SiO$_2$)$_4$ | 5 | Co$_{60}$Cr$_{40}$ | 45 |
| Example 17 | CPCB | 2 | CoPtCr—B$_2$O$_3$ | 14 | RuCoCr(TiO$_2$) | 2 | [Co$_{60}$Cr$_{40}$]$_{96}$(SiO$_2$)$_4$ | 5 | Co$_{60}$Cr$_{40}$ | 45 |
| Comparative Example 1 | — | — | CoPtCr—SiO$_2$ | 14 | — | — | [Co$_{60}$Cr$_{40}$]$_{96}$(SiO$_2$)$_4$ | 20 | Co$_{60}$Cr$_{40}$ | 30 |
| Comparative Example 2 | — | — | CoPtCr—SiO$_2$ | 14 | — | — | [Co$_{60}$Cr$_{40}$]$_{96}$(SiO$_2$)$_4$ | 20 | Co$_{60}$Cr$_{40}$ | 40 |
| Comparative Example 3 | — | — | CoPtCr—SiO$_2$ | 14 | — | — | [Co$_{60}$Cr$_{40}$]$_{96}$(SiO$_2$)$_4$ | 20 | Co$_{60}$Cr$_{40}$ | 50 |
| Comparative Example 4 | — | — | CoPtCr—SiO$_2$ | 14 | — | — | [Co$_{60}$Cr$_{40}$]$_{96}$(SiO$_2$)$_4$ | 15 | Co$_{60}$Cr$_{40}$ | 30 |
| Comparative Example 5 | — | — | CoPtCr—SiO$_2$ | 14 | — | — | [Co$_{60}$Cr$_{40}$]$_{96}$(SiO$_2$)$_4$ | 15 | Co$_{60}$Cr$_{40}$ | 40 |
| Comparative Example 6 | — | — | CoPtCr—SiO$_2$ | 14 | — | — | [Co$_{60}$Cr$_{40}$]$_{96}$(SiO$_2$)$_4$ | 15 | Co$_{60}$Cr$_{40}$ | 50 |
| Comparative Example 7 | — | — | CoPtCr—SiO$_2$ | 14 | — | — | [Co$_{60}$Cr$_{40}$]$_{96}$(SiO$_2$)$_4$ | 10 | Co$_{60}$Cr$_{40}$ | 30 |
| Comparative Example 8 | — | — | CoPtCr—SiO$_2$ | 14 | — | — | [Co$_{60}$Cr$_{40}$]$_{96}$(SiO$_2$)$_4$ | 5 | Co$_{60}$Cr$_{40}$ | 30 |
| Comparative Example 9 | — | — | CoPtCr—SiO$_2$ | 14 | — | — | [Co$_{60}$Cr$_{40}$]$_{96}$(SiO$_2$)$_4$ | 5 | Co$_{60}$Cr$_{40}$ | 35 |
| Comparative Example 10 | — | — | CoPtCr—SiO$_2$ | 14 | — | — | [Co$_{60}$Cr$_{40}$]$_{96}$(SiO$_2$)$_4$ | 0 | Co$_{60}$Cr$_{40}$ | 40 |
| Comparative Example 11 | — | — | CoPtCr—SiO$_2$ | 14 | — | — | [Co$_{60}$Cr$_{40}$]$_{96}$(SiO$_2$)$_4$ | 1 | Co$_{60}$Cr$_{40}$ | 40 |

TABLE 1-continued

| | Seed layer | | | | Soft magnetic underlayer (SUL) | Magnetic characteristics | | | | | | Determination |
| | First seed layer | | Second seed layer | | | | | | | | | |
| | Material | Thickness (nm) | Material | Thickness (nm) | CoZrNb Thickness (nm) | Ms (emu/cc) | α | Hc (Oe) | Squareness ratio (%) | Hk (Oe) | ΔI (11.0)/ ΔI (10.0) | I (10.0)/ $I_{BG}$ (10.0) | index BBSNR (dB) |
|---|---|---|---|---|---|---|---|---|---|---|---|---|---|
| Example 1 | Ni$_{94}$W$_6$ | 5 | (TiCr)$_{98}$O$_2$ | 2 | — | 550 | 1.9 | 1800 | 93 | 14500 | 0.8 | 1.4 | 23 |
| Example 2 | Ni$_{94}$W$_6$ | 5 | (TiCr)$_{98}$O$_2$ | 2 | — | 550 | 1.7 | 2000 | 95 | 14500 | 0.8 | 1.4 | 24 |
| Example 3 | Ni$_{94}$W$_6$ | 5 | (TiCr)$_{98}$O$_2$ | 2 | — | 550 | 1.8 | 2000 | 93 | 15000 | 0.9 | 1.5 | 24 |
| Example 4 | Ni$_{94}$W$_6$ | 5 | (TiCr)$_{98}$O$_2$ | 2 | — | 550 | 1.8 | 2300 | 93 | 15000 | 0.9 | 1.5 | 25 |
| Example 5 | Ni$_{94}$W$_6$ | 5 | (TiCr)$_{98}$O$_2$ | 2 | — | 550 | 1.8 | 2300 | 93 | 14700 | 0.85 | 1.5 | 25 |
| Example 6 | Ni$_{94}$W$_6$ | 5 | (TiCr)$_{98}$O$_2$ | 2 | — | 550 | 1.8 | 2300 | 93 | 15000 | 0.9 | 1.5 | 25 |
| Example 7 | Ni$_{94}$W$_6$ | 5 | (TiCr)$_{98}$O$_2$ | 2 | — | 590 | 1.4 | 2600 | 96 | 15000 | 0.9 | 1.5 | 27 |
| Example 8 | Ni$_{94}$W$_6$ | 5 | (TiCr)$_{98}$O$_2$ | 2 | — | 590 | 1.4 | 2600 | 96 | 15000 | 0.9 | 1.5 | 27 |
| Example 9 | Ni$_{94}$W$_6$ | 5 | (TiCr)$_{98}$O$_2$ | 2 | — | 550 | 1.9 | 1800 | 93 | 14200 | 0.7 | 1.3 | 23 |
| Example 10 | Ni$_{94}$W$_6$ | 5 | (TiCr)$_{98}$O$_2$ | 2 | — | 550 | 1.6 | 2500 | 95 | 15000 | 0.9 | 1.5 | 26 |
| Example 11 | Ni$_{94}$W$_6$ | 5 | (TiCr)$_{98}$O$_2$ | 2 | — | 550 | 1.4 | 2600 | 96 | 15000 | 0.9 | 1.5 | 27 |
| Example 12 | Ni$_{94}$W$_6$ | 5 | (TiCr)$_{98}$O$_2$ | 2 | — | 550 | 1.4 | 2600 | 96 | 15000 | 0.9 | 1.5 | 27 |
| Example 13 | Ni$_{94}$W$_6$ | 5 | (TiCr)$_{98}$O$_2$ | 2 | — | 590 | 1.3 | 2800 | 97 | 15000 | 0.9 | 1.5 | 28 |
| Example 14 | Ni$_{94}$W$_6$ | 5 | (TiCr)$_{98}$O$_2$ | 2 | — | 590 | 1.3 | 2800 | 97 | 15000 | 0.9 | 1.5 | 28 |
| Example 15 | Ni$_{94}$W$_6$ | 5 | (TiCr)$_{98}$O$_2$ | 2 | — | 590 | 1.5 | 2700 | 98 | 14700 | 0.85 | 1.4 | 29 |
| Example 16 | Ni$_{94}$W$_6$ | 5 | (TiCr)$_{98}$O$_2$ | 2 | — | 590 | 1.5 | 2700 | 98 | 14700 | 0.85 | 1.4 | 29 |
| Example 17 | Ni$_{94}$W$_6$ | 5 | (TiCr)$_{98}$O$_2$ | 2 | 30 | 590 | 1.5 | 2700 | 98 | 14700 | 0.85 | 1.4 | 28 |
| Comparative Example 1 | Ni$_{94}$W$_6$ | 5 | (TiCr)$_{98}$O$_2$ | 2 | — | 550 | 2 | 1900 | 93 | 14000 | 0.4 | 1.4 | 22 |
| Comparative Example 2 | Ni$_{94}$W$_6$ | 5 | (TiCr)$_{98}$O$_2$ | 2 | — | 550 | 2 | 1900 | 93 | 14200 | 0.45 | 1.4 | 22 |
| Comparative Example 3 | Ni$_{94}$W$_6$ | 5 | (TiCr)$_{98}$O$_2$ | 2 | — | 550 | 2 | 1900 | 93 | 14200 | 0.45 | 1.4 | 22 |
| Comparative Example 4 | Ni$_{94}$W$_6$ | 5 | (TiCr)$_{98}$O$_2$ | 2 | — | 550 | 2.1 | 1800 | 91 | 14100 | 0.5 | 1.4 | 20 |
| Comparative Example 5 | Ni$_{94}$W$_6$ | 5 | (TiCr)$_{98}$O$_2$ | 2 | — | 550 | 2.1 | 1800 | 91 | 14300 | 0.5 | 1.4 | 20 |
| Comparative Example 6 | Ni$_{94}$W$_6$ | 5 | (TiCr)$_{98}$O$_2$ | 2 | — | 550 | 2.1 | 1800 | 91 | 14300 | 0.5 | 1.4 | 20 |
| Comparative Example 7 | Ni$_{94}$W$_6$ | 5 | (TiCr)$_{98}$O$_2$ | 2 | — | 550 | 2.3 | 1600 | 90 | 14200 | 0.6 | 1.4 | 19 |
| Comparative Example 8 | Ni$_{94}$W$_6$ | 5 | (TiCr)$_{98}$O$_2$ | 2 | — | 550 | 2.4 | 1500 | 86 | 14300 | 0.6 | 1.4 | 18 |
| Comparative Example 9 | Ni$_{94}$W$_6$ | 5 | (TiCr)$_{98}$O$_2$ | 2 | — | 550 | 2.1 | 1900 | 91 | 14300 | 0.6 | 1.4 | 21 |
| Comparative Example 10 | Ni$_{94}$W$_6$ | 5 | (TiCr)$_{98}$O$_2$ | 2 | — | 550 | 2.6 | 1000 | 65 | 12500 | 0.3 | 1.2 | 17 |
| Comparative Example 11 | Ni$_{94}$W$_6$ | 5 | (TiCr)$_{98}$O$_2$ | 2 | — | 550 | 2.3 | 1400 | 85 | 13300 | 0.3 | 1.3 | 20 |

For each of the magnetic recording tapes of Examples 1 to 17 and Comparative Examples 1 to 11 having the above layer configurations, characteristics regarding a total of five items including the following (1) to (5) were evaluated. Methods for measuring the five items are as follows.

(1) Saturation Magnetization Amount Ms

A saturation magnetization amount Ms in a perpendicular direction is determined as follows. First, an adhesive tape is attached to front and back surfaces of the magnetic recording medium T to reinforce the magnetic recording medium T, and then the magnetic recording medium T is punched with a φ6.39 mm punch to prepare a measurement sample. At this time, marking is performed with an arbitrary ink having no magnetism such that a longitudinal direction (traveling direction) of the magnetic recording medium T can be recognized. Then, an M-H loop of the measurement sample (the entire magnetic recording medium T) corresponding to the perpendicular direction (thickness direction) of the magnetic recording medium T is measured using a VSM. Next, the coating film (the ground layer 3, the recording layer 1, the back layer 6, and the like) is wiped off using acetone, ethanol, and the like, leaving only the base layer 5. Then, an adhesive tape is attached to front and back surfaces of the obtained base layer 5 to reinforce the base layer 5, and then the base layer 5 is punched with a φ6.39 mm punch to obtain a background correction sample (hereinafter simply referred to as "correction sample"). Thereafter, an M-H loop of the correction sample (base layer 5) corresponding to the perpendicular direction of the base layer 5 (perpendicular direction of the magnetic recording medium T) is measured using a VSM.

In the measurement of the M-H loop of the measurement sample (the entire magnetic recording medium T) and the M-H loop of the correction sample (base layer 5), a vibrating sample magnetometer "7400-0R type" manufactured by Lakeshore is used. Measurement conditions are set to measurement mode: full loop, maximum magnetic field: 15 kOe, magnetic field step: 500 Oe, time constant: 0.1 sec, and MH average number: 10.

After the M-H loop of the measurement sample (the entire magnetic recording medium T) and the M-H loop of the correction sample (base layer 5) are obtained, the M-H loop of the correction sample (base layer 5) is subtracted from the M-H loop of the measurement sample (the entire magnetic recording medium T) to perform background correction, and a background-corrected M-H loop is obtained. For the calculation of background correction, a measurement/analysis program attached to "7400-0R type" is used.

A value obtained by dividing the total saturation magnetization amount Ms (emu) of the obtained background-corrected M-H loop by the sample volume was defined as a saturation magnetization amount Ms (emu/cc). Note that each of the above measurements of the M-H loops is performed at 25° C. Furthermore, when the M-H loop is measured in the perpendicular direction of the magnetic recording medium T, "demagnetizing field correction" is not performed.

(2) α

α in the perpendicular direction is determined as follows. First, an adhesive tape is attached to front and back surfaces of the magnetic recording medium T to reinforce the magnetic recording medium T, and then the magnetic recording medium T is punched with a φ6.39 mm punch to prepare a measurement sample. At this time, marking is performed with an arbitrary ink having no magnetism such that a longitudinal direction (traveling direction) of the magnetic recording medium T can be recognized. Then, an M-H loop of the measurement sample (the entire magnetic recording medium T) corresponding to the perpendicular direction (thickness direction) of the magnetic recording medium T is measured using a VSM. Next, the coating film (the ground layer 3, the recording layer 1, the back layer 6, and the like) is wiped off using acetone, ethanol, and the like, leaving only the base layer 5. Then, an adhesive tape is attached to front and back surfaces of the obtained base layer 5 to reinforce the base layer 5, and then the base layer 5 is punched with a φ6.39 mm punch to obtain a background correction sample (hereinafter simply referred to as "correction sample"). Thereafter, an M-H loop of the correction sample (base layer 5) corresponding to the perpendicular direction of the base layer 5 (perpendicular direction of the magnetic recording medium T) is measured using a VSM.

In the measurement of the M-H loop of the measurement sample (the entire magnetic recording medium T) and the M-H loop of the correction sample (base layer 5), a vibrating sample magnetometer "7400-0R type" manufactured by Lakeshore is used. Measurement conditions are set to measurement mode: full loop, maximum magnetic field: 15 kOe, magnetic field step: 500 Oe, time constant: 0.1 sec, and MH average number: 10.

After the M-H loop of the measurement sample (the entire magnetic recording medium T) and the M-H loop of the correction sample (base layer 5) are obtained, the M-H loop of the correction sample (base layer 5) is subtracted from the M-H loop of the measurement sample (the entire magnetic recording medium T) to perform background correction, and a background-corrected M-H loop is obtained. For the calculation of background correction, a measurement/analysis program attached to "7400-0R type" is used.

An inclination (dM/dH) of the M-H loop in a magnetic field (so-called coercive force Hc) in which a magnetization amount was zero in a + direction of the obtained background-corrected M-H loop was set to α. Note that each of the above measurements of the M-H loops is performed at 25° C. Furthermore, when the M-H loop is measured in the perpendicular direction of the magnetic recording medium T, "demagnetizing field correction" is not performed.

(3) Coercive Force Hc

The coercive force Hc in the perpendicular direction is determined as follows. First, an adhesive tape is attached to front and back surfaces of the magnetic recording medium T to reinforce the magnetic recording medium T, and then the magnetic recording medium T is punched with a φ6.39 mm punch to prepare a measurement sample. At this time, marking is performed with an arbitrary ink having no magnetism such that a longitudinal direction (traveling direction) of the magnetic recording medium T can be recognized. Then, an M-H loop of the measurement sample (the entire magnetic recording medium T) corresponding to the perpendicular direction (thickness direction) of the magnetic recording medium T is measured using a VSM. Next, the coating film (the ground layer 3, the recording layer 1, the back layer 6, and the like) is wiped off using acetone, ethanol, and the like, leaving only the base layer 5. Then, an adhesive tape is attached to front and back surfaces of the obtained base layer 5 to reinforce the base layer 5, and then the base layer 5 is punched with a φ6.39 mm punch to obtain a background correction sample (hereinafter simply referred to as "correction sample"). Thereafter, an M-H loop of the correction sample (base layer 5) corresponding to the perpendicular direction of the base layer 5 (perpendicular direction of the magnetic recording medium T) is measured using a VSM.

In the measurement of the M-H loop of the measurement sample (the entire magnetic recording medium T) and the M-H loop of the correction sample (base layer 5), a vibrating sample magnetometer "7400-0R type" manufactured by Lakeshore is used. Measurement conditions are set to measurement mode: full loop, maximum magnetic field: 15 kOe, magnetic field step: 500 Oe, time constant: 0.1 sec, and MH average number: 10.

After the M-H loop of the measurement sample (the entire magnetic recording medium T) and the M-H loop of the correction sample (base layer 5) are obtained, the M-H loop of the correction sample (base layer 5) is subtracted from the M-H loop of the measurement sample (the entire magnetic recording medium T) to perform background correction, and a background-corrected M-H loop is obtained. For the calculation of background correction, a measurement/analysis program attached to "7400-0R type" is used.

The coercive force Hc is determined from the obtained background-corrected M-H loop. Note that for this calculation, a measurement/analysis program attached to "7400-0R type" is used. Note that each of the above measurements of the M-H loops is performed at 25° C. Furthermore, when the M-H loop is measured in the perpendicular direction of the magnetic recording medium T, "demagnetizing field correction" is not performed.

(4) Squareness Ratio S2 in Perpendicular Direction

A squareness ratio S2 in the perpendicular direction is determined as follows. First, an adhesive tape is attached to front and back surfaces of the magnetic recording medium T to reinforce the magnetic recording medium T, and then the magnetic recording medium T is punched with a φ6.39 mm punch to prepare a measurement sample. At this time, marking is performed with an arbitrary ink having no magnetism such that a longitudinal direction (traveling direction) of the magnetic recording medium T can be recognized. Then, an M-H loop of the measurement sample (the entire magnetic recording medium T) corresponding to the perpendicular direction (thickness direction) of the magnetic recording medium T is measured using a VSM. Next, the coating film (the ground layer 3, the recording layer 1, the back layer 6, and the like) is wiped off using acetone, ethanol, and the like, leaving only the base layer 5. Then, an adhesive tape is attached to front and back surfaces of the obtained base layer 5 to reinforce the base layer 5, and then the base layer 5 is punched with a φ6.39 mm punch to obtain a background correction sample (hereinafter simply referred to as "correction sample"). Thereafter, an M-H loop of the correction sample (base layer 5) corresponding to the perpendicular direction of the base layer 5 (perpendicular direction of the magnetic recording medium T) is measured using a VSM.

In the measurement of the M-H loop of the measurement sample (the entire magnetic recording medium T) and the M-H loop of the correction sample (base layer 5), a vibrating sample magnetometer "7400-0R type" manufactured by Lakeshore is used. Measurement conditions are set to measurement mode: full loop, maximum magnetic field: 15 kOe, magnetic field step: 500 Oe, time constant: 0.1 sec, and MH average number: 10.

After the M-H loop of the measurement sample (the entire magnetic recording medium T) and the M-H loop of the correction sample (base layer 5) are obtained, the M-H loop of the correction sample (base layer 5) is subtracted from the M-H loop of the measurement sample (the entire magnetic recording medium T) to perform background correction, and a background-corrected M-H loop is obtained. For the calculation of background correction, a measurement/analysis program attached to "7400-0R type" is used.

The squareness ratio S2 (%) is calculated by putting saturation magnetization Ms (emu) and residual magnetization Mr (emu) of the obtained background-corrected M-H loop into the following formula. Note that each of the above measurements of the M-H loops is performed at 25° C. Furthermore, when the M-H loop is measured in the perpendicular direction of the magnetic recording medium T, "demagnetizing field correction" is not performed. Note that for this calculation, a measurement/analysis program attached to "7400-0R type" is used.

Squareness ratio $S2(\%)=(Mr/Ms)\times 100$ (5) Anisotropic Magnetic Field Hk

An anisotropic magnetic field Hk in the perpendicular direction is determined as follows. First, an adhesive tape is attached to front and back surfaces of the magnetic recording medium T to reinforce the magnetic recording medium T, and then the magnetic recording medium T is punched with a φ6.39 mm punch to prepare a measurement sample. At this time, marking is performed with an arbitrary ink having no magnetism such that a longitudinal direction (traveling direction) of the magnetic recording medium T can be recognized. Then, using a magnetic anisotropic torque meter, a torque curve of the measurement sample (the entire magnetic recording medium T) corresponding to the perpendicular direction (thickness direction) of the magnetic recording medium T is measured. In the measurement of the torque curve, a magnetic anisotropic torque meter "TRT-2 type" manufactured by Toei Industry Co., Ltd. is used. Measurement conditions are set to measurement mode: Torqe-Angle and magnet rotation speed: 4 min./360. The measurement is performed in each of applied magnetic fields of 10,000 Ce, 12500 Ce, and 15000 Ce, and magnetic anisotropy energy constants Ku1 (erg/cm$^3$) and Ku2 (erg/cm$^3$) are determined by the following formulas using obtained parameters L2 (dyne-cm) and L4 (dyne-cm). r (mm) represents a radius of a measurement sample, and t represents a thickness (nm) of a magnetic film.

$Ku1=A2-Ku2-2\pi Ms^2$ $Ku2=2*A4$ $A2=L2/(\pi r^2*t)*10^9$ $A4=L4/(\pi r^2*t)*10^9$

Ku1 (erg/cm$^3$) and Ku2 (erg/cm$^3$) in each applied magnetic field were plotted with respect to (1/applied magnetic field), and values determined by extrapolation in a case where the applied magnetic field was set to were represented by Ku1' (erg/cm$^3$) and Ku2' (erg/cm$^3$), respectively. A sum thereof (Ku1'+Ku2') was defined as a magnetic anisotropy energy constant Ku (erg/cm$^3$). Moreover, an anisotropic magnetic field Hk (Oe) was determined by the following formula.

$Hk=2*Ku/Ms$

The anisotropic magnetic field Hk is a numerical value reflecting magnetic anisotropy determined by a material composition constituting the recording layer, particularly the Pt content, and the degree of crystal orientation thereof. Here, since the Pt content is the same in all the cases, it can be said that a difference in Hk reflects the degree of crystal orientation. Since the magnetic anisotropy of the CoPt-based magnetic material is magnetocrystalline anisotropy, the magnetic anisotropy of the CoPt-based magnetic material is affected by crystal orientation of the hexagonal close-packed structure (hcp) in the C-axis direction, and the anisotropic magnetic field is high in a state where the crystal orientation is high, and the anisotropic magnetic field is low in a case where the degree of crystal orientation is low. It can be said that the crystal orientation is favorable when Hk is 14000 Oe or more, but it is difficult to write a signal by the recording head when Hk is about 16000. Therefore, it can be said that Hk is preferably about 14000 Oe or more and less than 16000 Oe. Here, the crystal orientation is closely related to the thickness of the first ground layer, Hk is maximized when the thickness of the first ground layer is 5 nm, and Hk gradually decreases as the thickness of the first ground layer increases. Furthermore, the thickness of the first ground layer needs to be at least 2 nm, and when the thickness is thinner than 2 nm, Hk tends to decrease largely.

(6) SNR

A reproduction signal of a magnetic tape was acquired using a loop tester (manufactured by MicroPhysics, Inc.). Acquisition conditions of the reproduction signal are described below.
Writer: Ring Type head
Reader: GMR head
Speed: 2 m/s
Signal: single recording frequency (300 kfci)
Recording current: optimum recording current A recording wavelength was set to 300 kilo flux changes per inch (kFCI), and an SNR was calculated and determined by a ratio between a voltage of a reproduction waveform and a voltage determined from a value obtained by integrating a noise spectrum in a band of 0 kFCI to 600 kFCI. The width of the reader used in this evaluation is 2.0 μm, but it is considered that the width of the reader is about 0.5 μm in a magnetic tape to which application of the present technology is considered. An SNR evaluated by the latter reader is calculated to decrease by 6 dB with respect to an SNR evaluated by the former reader. In the measurement method described above, a so-called broad-band SNR (BB-SNR), in a case where use at a product level is assumed, a minimum SNR required to establish a recording/reproducing system is generally 17 dB. Therefore, in this evaluation, "23 dB (=17 dB+6 dB) or more" was determined to be a favorable SNR level. Evaluation results are presented in the above "Table 1".

(7) In-Plane X-Ray Diffractometry (in-Plane XRD)

Figure 15:
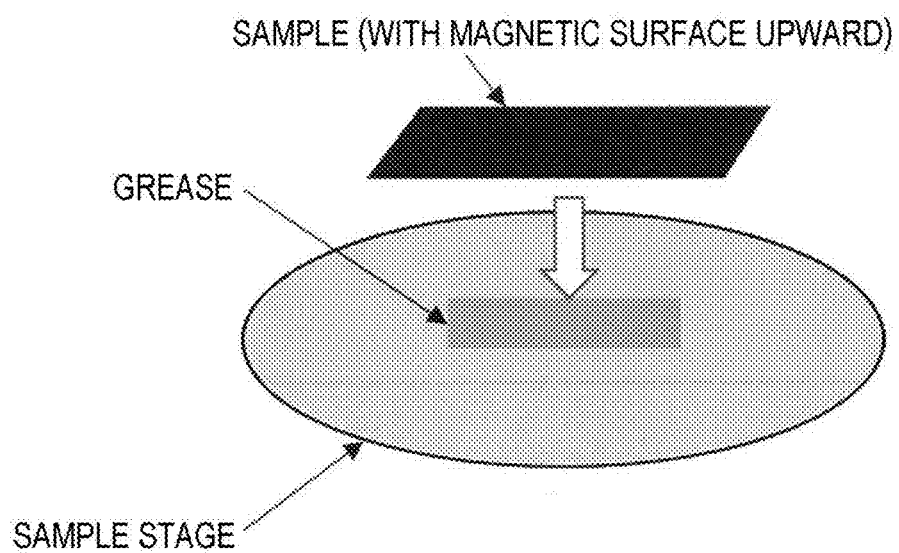
FIG. 15 is a schematic diagram schematically illustrating a state in which a measurement sample is fixed on a sample stage of an in-plane X-ray diffractometer in in-plane X-ray diffractometry (In-Plane XRD).

As illustrated in FIG. 14, a magnetic tape was cut out to obtain a measurement sample (sample) having a width of 12.7 mm x a length of 40 mm. As illustrated in FIG. 15, the obtained measurement sample (sample) was fixed on a sample stage of an in-plane X-ray diffractometer (XRD) using grease with a magnetic surface of the measurement sample upward. In this case, air was extruded using a cotton swab or the like such that air did not enter a space between the measurement sample and the sample stage as much as possible to form a smooth surface. The measurement sample was fixed to an X-ray diffractometer (RIGAKU ATX-G), and then an X-ray relative intensity value of the magnetic tape was measured by in-plane X-ray diffractometry (In-Plane XRD). Note that analysis of the measurement result was performed in a similar manner to that in the description of the X-ray relative intensity value curve (XRD profile) in FIG. 13. Measurement conditions are described below.

Device: RIGAKU ATX-G
X-ray source: $CuK_\alpha$ ray
Angle step: 0.05°
Scan speed: 1.0°/min The results presented in Table 1 indicate the following.

Each of the magnetic recording tapes of Examples 1 to 17 had an SNR of 23 dB or more, which was favorable. In general, a minimum SNR required to establish a recording/reproducing system is about 17 dB in an SNR (so-called digital SNR) after processing of waveform equalization or error correction. Note that, in the magnetic tapes of the present Examples, assuming that a linear recording density is 600 kilo bits per inch (kBPI), a track pit is twice the track width of the reproduction head, and a track density is 25.4 kilo tracks per inch (kTPI), an area recording density of 600 kBPI×25.4 kTPI=15 $Gb/in^2$ or more can be achieved.

Furthermore, the values of α of the magnetic recording tapes of Examples 1 to 17 were all less than 2 (more specifically, 1.9 or less), which were lower than those of Comparative Examples (the values of α were 2 or more). Therefore, it can be seen that the magnetic recording tapes of Examples 1 to 17 are excellent in magnetic characteristics. As described above, the value of a of the magnetic recording tape of the present technology is preferably less than 2, more preferably 1.8 or less, and still more preferably 1.5 or less.

Moreover, regarding the squareness ratio, the squareness ratios of Examples 1 to 17 in the perpendicular direction were all 90% or more, and the magnetic recording tapes were excellent in magnetic characteristics and capable of performing efficient recording. As described above, the squareness ratio of the magnetic recording tape of the present technology in the perpendicular direction may be, for example, 65% or more, can be preferably 70% or more, 80% or more, or 90% or more, and more preferably 91% or more, 92% or more, 93% or more, 94% or more, or 95% or more.

Regarding each of the magnetic recording tapes of Examples 1 to 17, the X-ray relative intensity value obtained by in-plane X-ray diffractometry satisfied the following relational formula, indicating that the degree of orientation of the c-axis in the recording layer was high.

$$\Delta I(11.0)/\Delta I(10.0) \geq 0.7$$

Furthermore, regarding each of the magnetic recording tapes of Examples 1 to 17, the X-ray relative intensity value obtained by in-plane X-ray diffractometry satisfied the following relational formula, indicating that the degree of orientation of the c-axis in the recording layer was high.

$$I(10.0)/I_{BG}(10.0) \geq 1.4$$

Comparing Example 1 with Comparative Example 10, in the magnetic recording tape of Example 1, the thickness of the first ground layer was 10 nm, the thickness of the second ground layer was 40 nm, and the SNR was 23, whereas the magnetic recording tape of Comparative Example 10 had the same film configuration as Example 1 except that the first ground layer was not formed, and had an SNR of 17 dB.

Comparing Example 1 with Comparative Example 5, in the magnetic recording tape of Example 1, the thickness of the first ground layer was 10 nm, the thickness of the second ground layer was 40 nm, and the SNR was 23, whereas in the magnetic recording tape of Comparative Example 5, the thickness of the first ground layer was 15 nm, the thickness of the second ground layer was 40 nm, which is the same as that in Example 1, and the SNR was dB. Furthermore, comparing Example 9 with Comparative Example 11, in the magnetic recording tape of Example 9, the thickness of the first ground layer was 2 nm, the thickness of the second ground layer was 40 nm, and the SNR was 23, whereas in the magnetic recording tape of Comparative Example 11, the thickness of the first ground layer was 1 nm, which is thinner than that in Example 9, the thickness of the second ground layer was 40 nm, which is the same as that in Example 9, and the SNR was 20 dB. From these results, it was found that a favorable SNR was exhibited when the thickness of the first ground layer was 2 nm or more and 10 nm or less. Comparing Example 1 with Comparative Example 7, in the magnetic recording tape of Example 1, the thickness of the first ground layer was 10 nm, the thickness of the second ground layer was 40 nm, and the SNR was 23, whereas in the magnetic recording tape of Comparative Example 7, the thickness of the first ground layer was 10 nm, which is the same as that in Example 1, the thickness of the second ground layer was 30 nm, and the SNR was 19 dB. From this result, it was found that a favorable SNR was exhibited when the thickness of the second ground layer was 40 nm or more.

As described in Examples 3, 4, and 5, it was found that when the thickness of the first ground layer was fixed to 5 μm and the thickness of the second ground layer was increased from 40 μm to 45 μm, and then to 50 μm, the SNR increased from 24 to 25.

Example 6 had the same film configuration as that of Example 4 except that the first ground layer was changed to a layer containing $[Co_{(100-y)}Cr_y]_{(100-z)}(TiO_2)_z$ (in which y=40 and z=4), and had an SNR of 25 dB, which was further favorable.

Examples 7 and 8 had the same film configurations as those of Examples 4 and 6, respectively, except that the recording layer was changed to a layer containing (Co- CrPt)—(B$_2$O$_3$), and had SNRs of 27 and 29 dB, respectively, which were further favorable.

Example 10 had the same film configuration as that of Example 4 except that an intermediate layer containing Ru and having a thickness of 2 μm was formed, and had an SNR of 26 dB, which was further favorable.

Example 11 had the same film configuration as that of Example 4 except that an intermediate layer containing (CoCrRu)—(TiO$_2$) and having a thickness of 2 μm was formed, and had an SNR of 27 dB, which was further favorable.

Example 12 had the same film configuration as that of Example 6 except that an intermediate layer containing (CoCrRu)—(TiO$_2$) and having a thickness of 2 μm was formed, and had an SNR of 27 dB, which was further favorable.

Example 13 had the same film configuration as that of Example 12 except that the recording layer was changed to a layer containing (CoCrPt)—(B$_2$O$_3$), and had an SNR of 28 dB, which was further favorable.

Example 14 had the same film configuration as that of Example 11 except that the recording layer was changed to a layer containing (CoCrPt)—(B$_2$O$_3$), and had an SNR of 28 dB, which was further favorable.

Example 15 had the same film configuration as that of Example 13 except that a CAP layer was formed, and had an SNR of 29 dB, which was further favorable.

Example 16 had the same film configuration as that of Example 14 except that a CAP layer was formed, and had an SNR of 29 dB, which was further favorable.

Example 17 had the same film configuration as that of Example 16 except that a SUL was formed, and had an SNR of 28 dB, which was favorable.

As described above, it has been found that Examples of the magnetic recording tape according to the present technology are excellent in magnetic characteristics and exhibit favorable SNRs as compared with Comparative Example.

REFERENCE SIGNS LIST

1 Recording layer
2 Intermediate layer
3 Ground layer
31 First ground layer
32 Second ground layer
4 Seed layer
41 First seed layer
42 Second seed layer
5 Base layer
6 Back layer
7 Soft magnetic underlayer (SUL)
10A Magnetic recording cartridge
10B Cartridge case
10C Reel
P Protective layer
L Lubricant layer
C CAP layer
T, T2, T3, T4, T5, T6 Magnetic recording medium

The invention claimed is:

1. A magnetic recording medium having a layer structure including a recording layer, a ground layer, and a base layer in this order, wherein
the ground layer includes a first ground layer on the recording layer side and a second ground layer on the base layer side, and
the first ground layer contains a nonmagnetic oxide, the first ground layer has a thickness of 2 nm or more and 10 nm or less, and the second ground layer has a thickness of 40 nm or more,
wherein the recording layer contains a Co-based alloy particle, and an X-ray relative intensity values of in-plane X-ray diffraction on a (11.0) plane and a (10.0) plane of the Co-based alloy particle satisfy a following relational formula:

$$\Delta I(11.0)/\Delta I(10.0) \geq 0.7$$

in which $\Delta I(11.0) = |I(11.0) - I_{BG}(11.0)|$ and $\Delta I(10.0) = |I(10.0) - I_{BG}(10.0)|$, and I(11.0) represents an X-ray relative intensity value on the (11.0) plane, $I_{BG}(11.0)$ represents a background value of the X-ray relative intensity value on the (11.0) plane, I(10.0) represents an X-ray relative intensity value on the (10.0) plane, and $I_{BG}(10.0)$ represents a background value of the X-ray relative intensity value on the (10.0) plane.

2. The magnetic recording medium according to claim 1, wherein the nonmagnetic oxide is SiO$_2$ or TiO$_2$.

3. The magnetic recording medium according to claim 1, wherein the first ground layer containing the nonmagnetic oxide contains a Co-based alloy having an average atomic number ratio represented by a following formula (1):

$$[Co_{(100-y)}Cr_y]_{(100-z)}(MO_2)_z \quad (1)$$

in which y satisfies $35 \leq y \leq 45$, z satisfies $z \leq 10$, and M is Si or Ti.

4. The magnetic recording medium according to claim 1, wherein the second ground layer contains a Co-based alloy, and the Co-based alloy has an average atomic number ratio represented by a following formula (2):

$$Co_{(100-y)}Cr_y \quad (2)$$

in which y satisfies $35 \leq y \leq 45$.

5. The magnetic recording medium according to claim 1, wherein the second ground layer has a thickness of 40 nm or more and 100 nm or less.

6. The magnetic recording medium according to claim 1, wherein the recording layer contains a nonmagnetic oxide, and the nonmagnetic oxide is B$_2$O$_3$.

7. The magnetic recording medium according to claim 1, wherein the recording layer contains the Co-based alloy particle, and the X-ray relative intensity value of in-plane X-ray diffraction on the (10.0) plane of the Co-based alloy particle satisfies a following relational formula:

$$I(10.0)/I_{BG}(10.0) \geq 1.4$$

in which I(10.0) represents an X-ray relative intensity value on the (10.0) plane, and $I_{BG}(10.0)$ represents a background value of the X-ray relative intensity value on the (10.0) plane.

8. The magnetic recording medium according to claim 1, wherein an intermediate layer containing ruthenium is formed between the recording layer and the first ground layer.

9. The magnetic recording medium according to claim 8, wherein the intermediate layer contains a ruthenium simple substance or a ruthenium alloy.

10. The magnetic recording medium according to claim 9, wherein the ruthenium alloy has an average atomic number ratio represented by a following formula (3):

$$[Ru_xCo_yCr_{100-x-y}]_{100-z}(MO_2)_z \quad (3)$$

in which, in the formula (3), x satisfies $10 \leq x \leq 60$, y satisfies $20 \leq y \leq 40$, z satisfies $5 \leq z \leq 20$, and M is Ti or Si.

11. The magnetic recording medium according to claim 1, comprising a seed layer between the ground layer and the base layer.

12. The magnetic recording medium according to claim 11, wherein the seed layer includes a first seed layer on the ground layer side and a second seed layer on the base layer side.

13. The magnetic recording medium according to claim 12, wherein the first seed layer contains a nickel-tungsten alloy.

14. The magnetic recording medium according to claim 13, wherein the nickel-tungsten alloy has a composition of an average atomic number ratio represented by a following formula (4):

$$Ni_{(100-x)}W_x \quad (4)$$

in which x satisfies $1 \leq x \leq 10$.

15. The magnetic recording medium according to claim 12, wherein the second seed layer has an average atomic number ratio represented by a following formula (5):

$$(Ti_{(100-x)}Cr_x)_{(100-y)}O_y \quad (5)$$

in which x satisfies $30 \leq x \leq 70$, and y satisfies $y \leq 10$.

16. The magnetic recording medium according to claim 1, wherein a thickness $t_T$ of the magnetic recording medium satisfies $t_T \leq 5.6$ μm.

17. The magnetic recording medium according to claim 1, wherein a thickness $t_m$ of the recording layer satisfies $10 \text{ nm} \leq t_m \leq 20$ nm.

18. The magnetic recording medium according to claim 1, wherein the base layer has a thickness of 5.0 μm or less.

19. The magnetic recording medium according to claim 1, further comprising a back layer having a thickness $t_b$ satisfying $t_b \leq 0.6$ μm.

20. The magnetic recording medium according to claim 1, having a squareness ratio of 93% or more in a perpendicular direction.

21. A magnetic recording cartridge comprising a magnetic recording medium having a layer structure including a recording layer, a ground layer, and a base layer in this order,
the ground layer including a first ground layer on the recording layer side and a second ground layer on the base layer side,
the first ground layer containing a nonmagnetic oxide, the first ground layer having a thickness of 2 nm or more and 10 nm or less, and the second ground layer having a thickness of 40 nm or more, wherein
the magnetic recording medium is housed in a state of being wounded around a reel, and
wherein the recording layer contains a Co-based alloy particle, and an X-ray relative intensity values of in-plane X-ray diffraction on a (11.0) plane and a (10.0) plane of the Co-based alloy particle satisfy a following relational formula:

$$\Delta I(11.0)/\Delta I(10.0) \geq 0.7$$

in which $\Delta I(11.0) = |I(11.0) - I_{BG}(11.0)|$ and $\Delta I(10.0) = |I(10.0) - I_{BG}(10.0)|$, and $I(11.0)$ represents an X-ray relative intensity value on the (11.0) plane, $I_{BG}(11.0)$ represents a background value of the X-ray relative intensity value on the (11.0) plane, $I(10.0)$ represents an X-ray relative intensity value on the (10.0) plane, and $I_{BG}(10.0)$ represents a background value of the X-ray relative intensity value on the (10.0) plane.

22. The magnetic recording cartridge according to claim 21, wherein the recording layer contains the Co-based alloy particle, and the X-ray relative intensity value of in-plane X-ray diffraction on the (10.0) plane of the Co-based alloy particle satisfies a following relational formula:

$$I(10.0)/I_{BG}(10.0) \geq 1.4$$

in which $I(10.0)$ represents an X-ray relative intensity value on the (10.0) plane, and $I_{BG}(10.0)$ represents a background value of the X-ray relative intensity value on the (10.0) plane.

23. A magnetic recording medium having a layer structure including a recording layer, a ground layer, and a base layer in this order, wherein
the ground layer includes a first ground layer on the recording layer side and a second ground layer on the base layer side, and
the first ground layer contains a nonmagnetic oxide, the first ground layer has a thickness of 2 nm or more and 10 nm or less, and the second ground layer has a thickness of 40 nm or more,
wherein an intermediate layer containing ruthenium is formed between the recording layer and the first ground layer,
wherein the intermediate layer contains a ruthenium alloy, and
wherein the ruthenium alloy has an average atomic number ratio represented by a following formula (3):

$$[Ru_xCo_yCr_{100-x-y}]_{100-z}(MO_2)_z \quad (3)$$

in which, in the formula (3), x satisfies $10 \leq x \leq 60$, y satisfies $20 \leq y \leq 40$, z satisfies $5 \leq z \leq 20$, and M is Ti or Si.

24. A magnetic recording cartridge comprising a magnetic recording medium having a layer structure including a recording layer, a ground layer, and a base layer in this order,
the ground layer including a first ground layer on the recording layer side and a second ground layer on the base layer side,
the first ground layer containing a nonmagnetic oxide, the first ground layer having a thickness of 2 nm or more and 10 nm or less, and the second ground layer having a thickness of 40 nm or more,
wherein the magnetic recording medium is housed in a state of being wounded around a reel,
wherein an intermediate layer containing ruthenium is formed between the recording layer and the first ground layer,
wherein the intermediate layer contains a ruthenium alloy, and
wherein the ruthenium alloy has an average atomic number ratio represented by a following formula (3):

$$[Ru_xCo_yCr_{100-x-y}]_{100-z}(MO_2)_z \quad (3)$$

in which, in the formula (3), x satisfies $10 \leq x \leq 60$, y satisfies $20 \leq y \leq 40$, z satisfies $5 \leq z \leq 20$, and M is Ti or Si.

\* \* \* \* \*